US010832666B2

(12) United States Patent
Felt et al.

(10) Patent No.: US 10,832,666 B2
(45) Date of Patent: Nov. 10, 2020

(54) ADVANCED USER INTERFACE FOR VOICE SEARCH AND RESULTS DISPLAY

(71) Applicant: Verizon Patent and Licensing Inc., Arlington, VA (US)

(72) Inventors: Michelle Felt, Randolph, NJ (US); Thomas Michael McGurl, Red Bank, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 131 days.

(21) Appl. No.: 15/491,635

(22) Filed: Apr. 19, 2017

(65) Prior Publication Data

US 2018/0307761 A1 Oct. 25, 2018

(51) Int. Cl.
*G10L 15/22* (2006.01)
*G06F 16/683* (2019.01)
*G10L 15/30* (2013.01)

(52) U.S. Cl.
CPC ............ *G10L 15/22* (2013.01); *G06F 16/685* (2019.01); *G10L 15/30* (2013.01); *G10L 2015/223* (2013.01)

(58) Field of Classification Search
CPC ......... G10L 15/22; G10L 15/26; G10L 15/30; G10L 2015/223; G06F 17/30746; G06F 16/685
See application file for complete search history.

(56) References Cited

U.S. PATENT DOCUMENTS

| | | | | |
|---|---|---|---|---|
| 2007/0061303 A1* | 3/2007 | Ramer | ............ | G06F 17/30864 |
| 2007/0100650 A1* | 5/2007 | Ramer | ............ | G06F 17/30749 |
| | | | | 705/26.1 |
| 2008/0214155 A1* | 9/2008 | Ramer | ............ | G06F 16/951 |
| | | | | 455/414.1 |
| 2009/0029687 A1* | 1/2009 | Ramer | ............ | G06F 17/30905 |
| | | | | 455/414.3 |
| 2011/0055256 A1* | 3/2011 | Phillips | ............ | G10L 15/30 |
| | | | | 707/769 |
| 2015/0169635 A1* | 6/2015 | Jing | ............ | G06F 16/54 |
| | | | | 707/723 |
| 2017/0140006 A1* | 5/2017 | Yang | ............ | G06F 16/951 |
| 2017/0193062 A1* | 7/2017 | Nelson | ............ | G06F 3/04817 |

* cited by examiner

*Primary Examiner* — Robert W Beausoliel, Jr.
*Assistant Examiner* — Mohammad Solaiman Bhuyan

(57) ABSTRACT

A wireless communication device may include logic configured to receive a voice request via a microphone; convert the received voice request into a text request; and send the text request to a results processing system. The logic may receive information corresponding to one or more cards from the results processing system, wherein a particular one of the one or more cards is associated with a category associated with the voice request and display a card or series of cards, wherein the cards includes a list of items associated with a category or wherein the cards are identified as relevant by the user while making the selection.

20 Claims, 22 Drawing Sheets

ADVANCED USER INTERFACE FOR VOICE SEARCH AND RESULTS DISPLAY

BACKGROUND INFORMATION

Users of wireless devices may access web pages on the Internet using, for example, a mobile browser application running on a wireless device. In order to find information that a user desires, the user may enter a search query into a search bar of the browser application and send a request to a search engine. The search engine may return a set of search results and the user may select one of the search results to access content on the Internet. Many wireless devices provide a voice search option that enables a user to speak or voice a request in order to submit a search query to a search engine. However, a user may be presented with too many search results and/or results with low relevance in response to a voice search request, and the presentation of the search results in a user interface may be suboptimal.

DETAILED DESCRIPTION OF PREFERRED EMBODIMENTS

Figure 1:
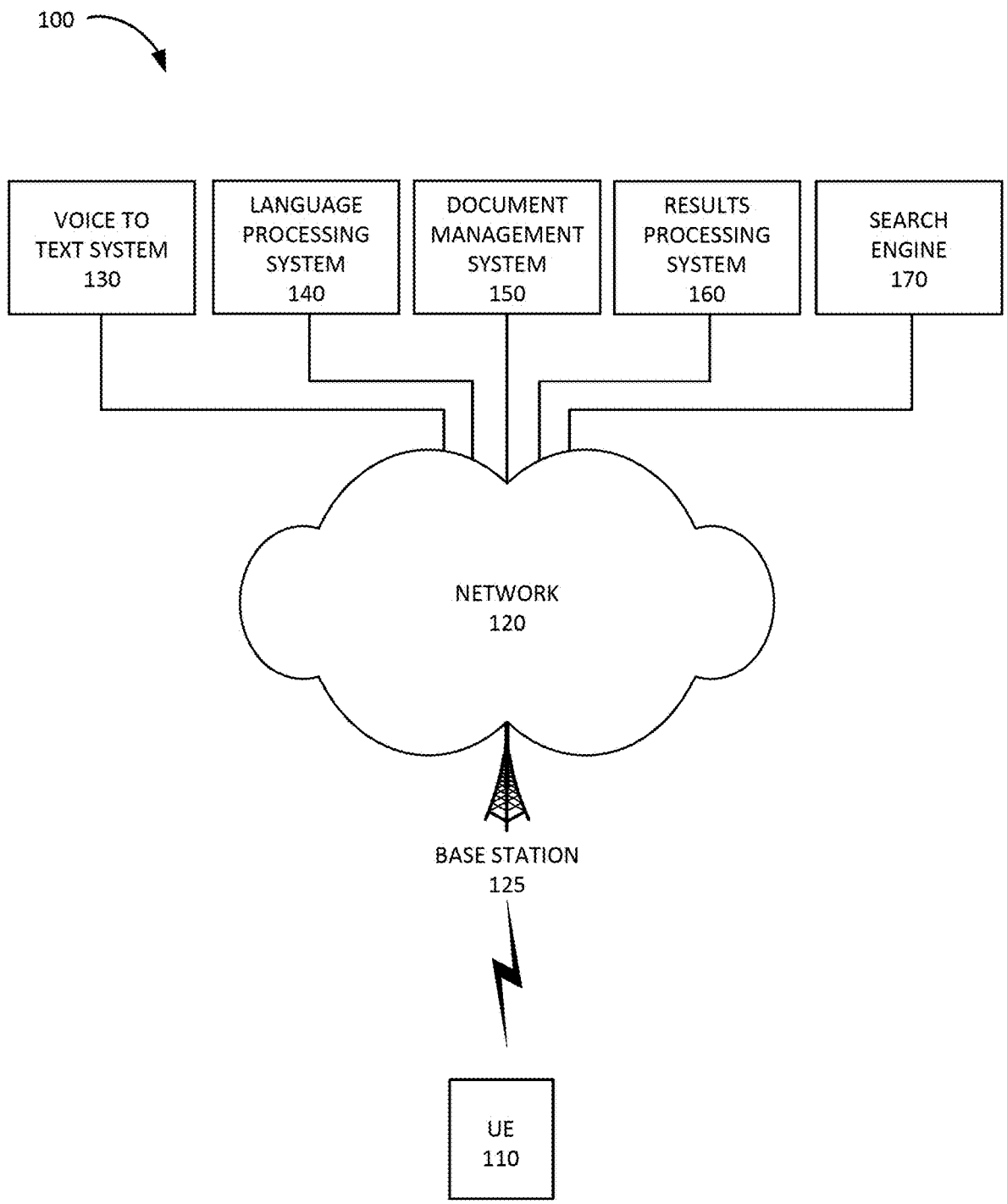
FIG. 1 is a diagram illustrating an environment according to an implementation described herein.

The following detailed description refers to the accompanying drawings. The same reference numbers in different drawings identify the same or similar elements.

Implementations described herein relate to systems and methods to perform an advanced voice search. An advanced voice search feature on a user device may enable a user to access information associated with a provider (e.g., a provider of communication services for which the user device has a subscription) using natural speech. The advanced voice search feature may provide relevant search results to a user's voice request in the form of categorized search results presented as items on a set of "category cards" displayed in a visual user interface.

The user device may receive a voice request, may convert the voice request into a text request, and may send the text request to results processing system. The results processing system may provide the text request to a language processing system that performs natural language processing on the text request to generate a search query based on the text request. The search query may then be used to search a document database to identify documents that match the search query. If a match is found in the document database, the results processing system may generate information corresponding to a set of category cards based on the identified documents. Each category card may include a set of selectable items and each item may link to another category card, to a document associated with a product, service, customer help page, and/or another type of document in the document database, or to an application installed on the user device. The generated category cards may then be sent to the user device. Furthermore, when a request is sent to the results processing system, the user device may include information identifying a subscription associated with the user device and the provided search results may be filtered based on information associated with the subscription.

As used herein, a "category card" may correspond to a visual object that is displayed on the user device. The visual object corresponding to the card may be manipulated by the user to change the size of the card, to move the card to a different location on the display, and/or to change the orientation of the card. Furthermore, the user may navigate to a different card by using available user input facilities—e.g., a touch screen detecting contact with the screen in a region in which a card is displayed, using a mouse or other positional device to "click" a selectable object on the card, or by using a voice or keyboard navigation command. When the user makes a selection in a category card, or navigates to a different category, another category card may be displayed as a result. Thus, the user's selections may result in a stack or layout of cards to which the user may return and which may function as a set of shortcuts to the user's previous selections. The user may select to display multiple cards at the same time as a stack or layout of cards in a sequence in which the user has visited the cards. The user may rearrange or stack the cards in a different order and/or may select how much of each card is shown on the display. When the user makes selections that result to the generation and/or display of a new card, the new card may be added to the stack or layout of cards and be available when the user selects to view, manipulate, and/or navigate the stack or layout of cards.

For example, the user device may display a first category card and may receive additional voice input from the user. The additional voice input may correspond to selection of an item on the displayed card and the user device may perform an action to activate the selected item. The action may include displaying another category card, accessing a document in the document database, activating an application on the user device, and/or requesting another card from the results processing system. Additionally, the user device may report the selection to the results processing system. Furthermore, a user may speak or voice a navigation command to move to another category card (e.g., to go back to a previously displayed card). Alternatively, the user may speak another voice request or may continue to speak or voice additional words in connection with the original voice request. The user device may display another one of the category cards or may send another request to the results processing system to update the search results. Thus, the displayed information may be updated in real-time as the user is speaking. Where the user's search query implicates multiple category cards, the result may be displayed as multiple category cards, thus allowing the user to view and/or access the multiple components of the search result in an order and fashion dictated by the user's requests.

In some situations, a match for the generated search query may not be identified in the document database. The results processing system may identify related search queries based on the original search query and may send the related search queries to the user device along with a prompt asking if any of the search queries satisfy the user's request. If the user selects one of the related search queries, the selected related search query may be processed as the original search query to identify documents in the document database and generate category cards based on the search results. Furthermore, an auto learning module may be activated to update the information in the document database and in a search query database based on the user's selection. If the user rejects all the provided related search queries, the original search query may be submitted to a search engine to obtain search results, the search results may be filtered based on relevance to products or services associated with the provider, and the filtered search results may be sent to the user device.

FIG. 1 is a diagram of an exemplary environment 100 in which the systems and/or methods, described herein, may be implemented. As shown in FIG. 1, environment 100 may include a user equipment (UE) 110, a network 120, a voice to text system 130, a language processing system 140, a document management system 150, a results processing system 160, and a search engine 170.

UE 110 may include a mobile communication device with wireless communication capabilities (e.g., a mobile phone, a smart phone, a phablet device, a tablet device, a wearable computer device (e.g., a head-mounted display computer device, a wristwatch computer device, etc.), a global positioning system (GPS) device, and/or another type of wireless device); a laptop computer or another type of portable computer; a media playing device; a portable gaming system; and/or any other type of mobile computer device with wireless communication and user interface capabilities. UE 110 may include a Subscriber Identity Module (SIM) card (not shown in FIG. 1). The SIM card may store information for one or more subscriptions that may be activated for UE 110. UE 110 may wirelessly communicate with network 120.

Network 120 may enable UE 110 to communicate with voice to text system 130, language processing system 140, document management system 150, results processing system 160, and/or search engine 170. Network 120 may include a base station 125 and UE 110 may wirelessly communicate with network 120 via base station 125. Network 120 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Network 120 may include an Internet Protocol Multimedia Subsystem (IMS) network (not shown in FIG. 1). Network 120, or part of network 120, may be managed by a provider of communication services and UE 110 may be associated with a subscription to the provider of communication services. In some embodiments, the provider of communication services may also manage one or more of voice to text system 130, language processing system 140, document management system 150, results processing system 160, and/or search engine 170.

Voice to text system 130 may include one or more devices, such as computer devices and/or server devices, which converts a voice request to a text request. In an example, voice to text system 130 may provide an application programming interface (API) which may be used by UE 110 to send voice data to voice to text system 130 and to receive text data based on the voice data. Voice to text system 130 may, for example, break down the voice data into phonemes and may perform audio analysis to convert the phonemes into words. Voice to text system 130 may use contextual analysis to disambiguate similar sounding words to determine the correct word being spoken.

Language processing system 140 may include one or more devices, such as computer devices and/or server devices, which performs natural language processing on a text request to generate a search query. In an example, language processing system 140 may receive a text request from results processing system 160 and may parse the text request into tokens. Language processing system 140 may then tag each token with a part of speech tag (e.g., a noun, a verb, an adjective, a proper noun, etc.) and may perform query modulation to identify relevant words based on the tagged tokens and/or to remove non-relevant tokens. Language processing system 140 may provide a generated search query to results processing system 160.

Document management system 150 may include one or more devices, such as computer devices and/or server devices, which manage, store, and/or update documents associated with the provider of communication services. In an example, document management system 150 may include a document database that includes documents that include information relating to particular products, services, store locations, customer services, and/or other types of information associated with the provider. Results processing system 160 may search the document database using a search query obtained from language processing system 140.

Results processing system 160 may include one or more devices, such as computer devices and/or server devices, which process the results for a voice request by organizing the results into one or more category cards. Results processing system 160 may receive a text request from UE 110 based on a voice request, may generate a search query from the text request via language processing system 140, and may use the search query to determine whether there are matching documents in the document database of document management system 150. Results processing system 160 may populate one or more category cards with a list of items. Each item may point to a document in the document database, to another one of the cards, or to an application installed on UE 110 (e.g., a navigation application, a purchasing application, a billing application, a customer service application, a messaging application, etc.).

Furthermore, results processing system 160 may include, or interface with, a user database that stores information relating to subscriptions associated with UEs 110. In an example, the user database may include information identifying types of wireless communication devices associated with a subscription, types of service plans associated with a subscription, types of services included in a subscription, a geographic location of a user associated with a subscription, and/or other types of information associated with a subscription. Results processing system 160 may filter search results based on the information associated with a subscription. In an example, if a user speaks or provides a voice command to buy accessories for the user's phone (e.g., UE 110), the search results may be filtered based on accessories compatible with the user's phone.

Search engine 170 may include one or more devices, such as computer devices and/or server devices, which provides search results to search queries based on a search of publicly available content on the Internet. In an example, search engine 170 may return a search engine results page to a browser application in response to receiving a search query from the browser application. When results processing system 160 does not find a match for a search query in the document database of document management system 150, results processing system 160 may submit the search query to search engine 170 and may filter the search results based on relevance to the provider's products and services. Results processing system 160 may provide the filtered search results to UE 110.

Although FIG. 1 shows exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
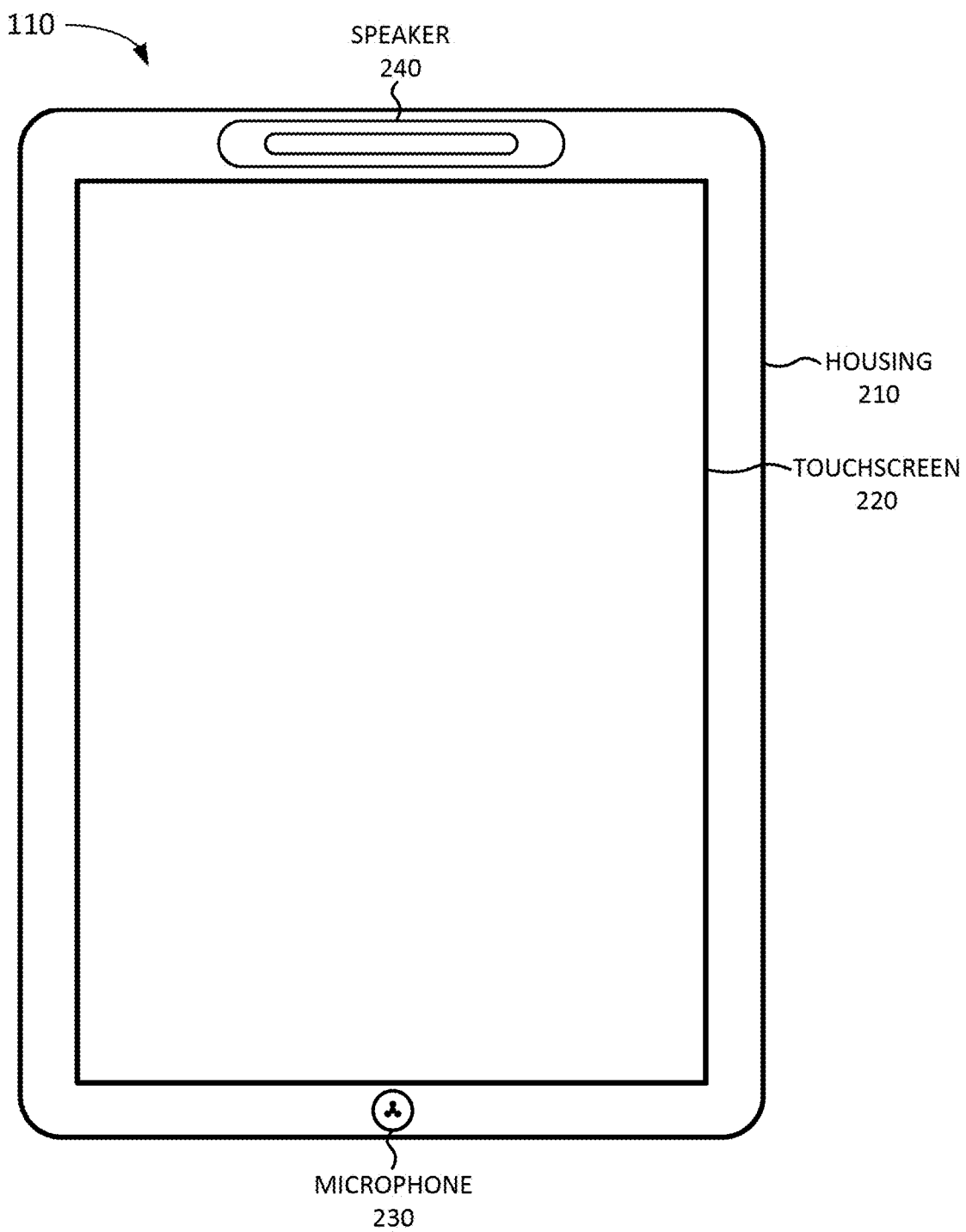
FIG. 2 is a diagram illustrating exemplary components of a mobile communication device that may correspond to the user equipment of FIG. 1.

FIG. 2 is a diagram of exemplary components of UE 110 according to an implementation. As shown in FIG. 2, UE 110 may include a housing 210, a touchscreen 220, a microphone 230, and a speaker 240.

Housing 210 may enclose UE 110 and may protect the components of UE 110 from the outside elements (e.g., moisture, dirt, etc.). Touchscreen 220 may include a display device and an input device configured to detect a user's touch. While FIG. 2 illustrates UE 110 with a touchscreen, in other implementations, UE 110 may not necessarily include a touchscreen. In an example, UE 110 may include a display and a keyboard and/or keypad. Touchscreen 220 may include a liquid crystal display (LCD), an electronic ink display (e.g., an electrophoretic display), an electroluminescent display, and/or another type of display. Furthermore, touchscreen 220 may include touch sensors, such as capacitive sensors (e.g., surface capacitive sensors, projected capacitive touch sensors, etc.), resistive sensors (e.g., analog resistive sensors, digital resistive sensors, etc.), optical sensors (e.g., optical imaging sensors, rear diffused illumination sensors, infrared grid sensors, diffused surface illumination sensors, etc.), acoustic wave sensors (e.g., surface acoustic wave sensors, bending wave sensors, etc.), and/or another type of touch sensors. Furthermore, touchscreen 220 may include sensors to sense an amount of force being applied to touchscreen 220, such as piezoresistive sensors.

Microphone 230 may receive audio signals and convert the received audio signals to electrical signals for UE 110. Speaker 240 may receive electrical signals from within UE 110 and generate audio signals based on the received electrical signals.

UE 110 may include additional sensors (not shown in FIG. 2). In an example, UE 110 may include one or more tilt sensors, such as accelerometers and/or gyroscopes, configured to sense a tilt, position, and/or orientation of UE 110 in space; one or more Global Positioning System (GPS) receivers; one or more magnetic field sensors (e.g., to sense the magnetic North); motion detection sensors to sense motion in the vicinity of UE 110; and/or other types of sensors.

Although FIG. 2 shows exemplary components of UE 110, in other implementations, UE 110 may include fewer components, different components, differently arranged components, or additional components than those depicted in FIG. 2. Additionally or alternatively, one or more components of UE 110 may perform functions described as being performed by one or more other components of UE 110.

Figure 3:
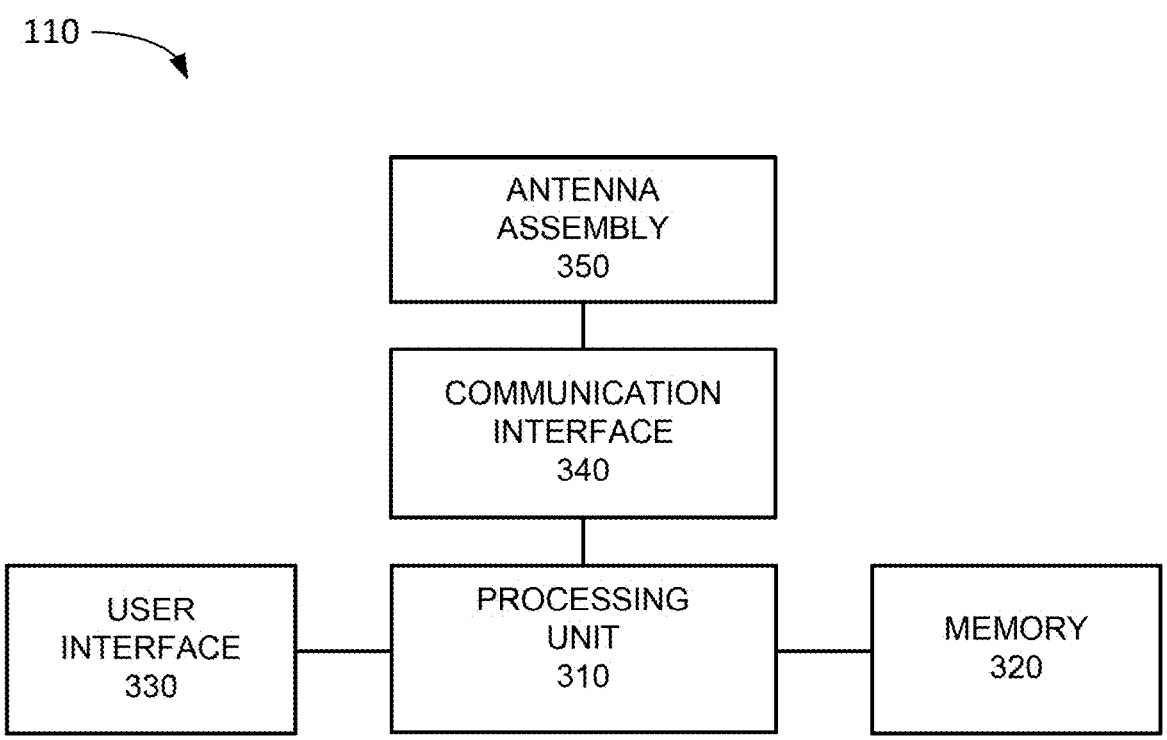
FIG. 3 is a diagram illustrating exemplary components of the user device of FIG. 1.

FIG. 3 is a diagram illustrating exemplary components of a UE 110 according to an implementation described herein. As shown in FIG. 3, UE 110 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of UE 110 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to UE 110 and/or to output information from UE 110. Examples of user interface 330 may include a speaker to receive electrical signals and output audio signals (e.g., speaker 240); a camera to receive image and/or video signals and output electrical signals; a microphone to receive sounds and output electrical signals (e.g., microphone 230); buttons (e.g., a joystick, control buttons, a keyboard, or keys of a keypad) and/or a touchscreen to receive control commands (e.g., touchscreen 220); a display, such as an LCD, to output visual information (e.g., touchscreen 220); an actuator to cause UE 110 to vibrate; and/or any other type of input or output device.

Communication interface 340 may include a transceiver that enables UE 110 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. In an example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals and receive RF signals and provide them to communication interface 340.

As described herein, UE 110 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hardwired circuitry may be used in place of, or in combination with, software instructions to implement processes described herein. Thus, implementations described herein are not limited to any specific combination of hardware circuitry and software.

Although FIG. 3 shows example components of UE 110, in other implementations, UE 110 may include fewer components, different components, differently arranged components, or additional components than depicted in FIG. 3. Additionally or alternatively, one or more components of UE 110 may perform the tasks described as being performed by one or more other components of UE 110.

Figure 4:
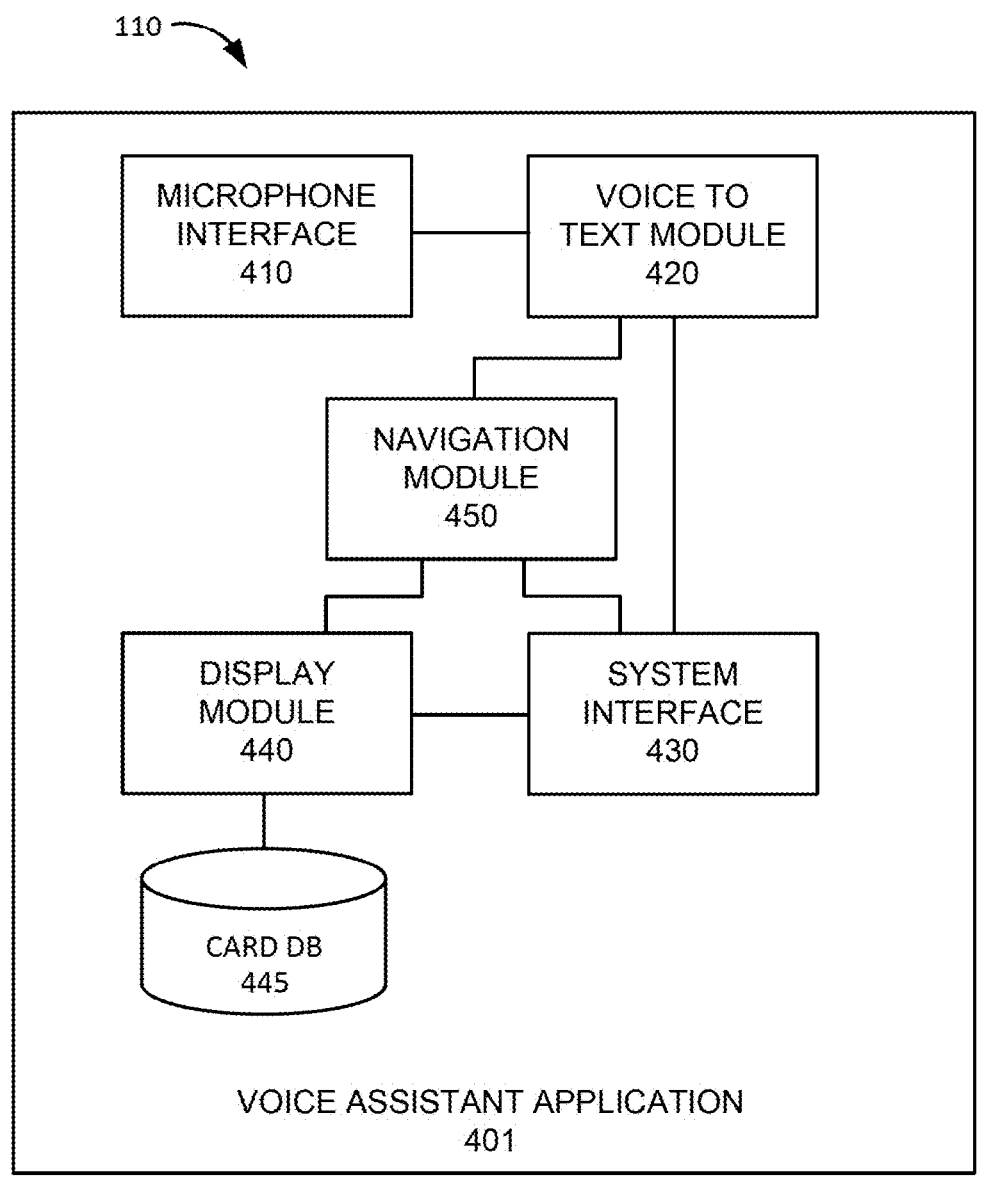
FIG. 4 is a diagram illustrating exemplary components of user device of FIG. 1.

FIG. 4 is a diagram illustrating exemplary components of UE 110 according to an implementation described herein. The components of UE 110 may be implemented, for example, via processing unit 310 executing instructions from memory 320. Alternatively, some or all of the components of UE 110 may be implemented via hard-wired circuitry. As shown in FIG. 4, UE 110 may include a voice assistant application 401. Voice assistant application 401 may provide search results to a user in response to voice requests and may enable the user to navigate, update, and/or refine the search results using voice commands. As shown in FIG. 4, voice assistant application 401 may include a microphone interface 410, a voice to text module 420, a system interface 430, a display module 440, a card database (DB) 445, and a navigation module 450.

Microphone interface 410 may interface with microphone 230 to obtain voice input spoken by the user into microphone 230. Furthermore, microphone interface 410 may perform initial signal processing to reduce noise, amplify the user's voice, and/or otherwise improve the quality of the obtained audio signal. Microphone interface 410 may provide the audio signal to voice to text module 420. Furthermore, microphone interface 410 may receive audio data corresponding to a voice selection for displayed content, such as a voice selection of an item listed on a category card.

Voice to text module 420 may convert a voice request included in audio data obtained by microphone interface 410 into a text request. In some implementations, voice to text module 420 may send the audio data to voice to text system 130 and may receive, from voice to text system 130, a text request corresponding to the voice request. In other implementations, voice to text module 420 may convert some or all of the audio data into a text request locally. As an example, voice to text module 420 may include a voice to text database for navigation commands (e.g., "go back," "start over," etc.). As another example, voice to text module 420 may include a voice to text database for selection of items included in a category card received from results processing system 160. Voice to text module 420 may provide a received text request to system interface 430.

System interface 430 may send a text request to results processing system 160 and may receive information corresponding to one or more category cards from results processing system 160 based on the sent text request. The received category cards may be provided to display module 440 and stored in card DB 445. Furthermore, system interface 430 may communicate with document management system 150 to access a requested document based on a user selection of an item included in a category card. Moreover, in some implementations, system interface 430 may communicate with language processing system 140 to convert a text request into a search query and may send a search query to results processing system 160.

Display module 440 may display a category card from a set of category cards received from results processing system 160 and stored in card DB 445. In an example, one of the cards may be designated as a first card or a top card and display module 440 may display the first or top card on touchscreen 220. The user may select one of the listed items and display module 440 may provide information identifying the selection to navigation module 450.

Navigation module 450 may activate the selected item in response. In an example, display module 440 may display another card in response to the selected item, may access a document stored in document management system 150, may activate an application on UE 110, and/or may perform another action. Furthermore, navigation module 450 may detect a navigation command (e.g., "go back," "start over," "go forward," "display all," etc.) and may navigate through the cards based on the navigation command. Moreover, navigation module 450 may display a stack or layout of cards previously viewed by the user and may enable the user to navigate through the stack or layout of cards, and/or to select a card from the stack or layout of cards to be displayed. In an embodiment, display module 440 may display specific cards from card DB 445 based on cards specified by the user via voice input via microphone 230. In an embodiment, the user may verbally specify the cards to be displayed and the order in which display module 440 is to present them on the display of UE 110.

Although FIG. 4 shows exemplary components of UE 110, in other implementations, UE 110 may include fewer components, different components, differently arranged components, or additional components than depicted in FIG. 4. Additionally or alternatively, one or more components of UE 110 may be combined such that the described capabilities are part of one or more other components of UE 110.

Figure 5:
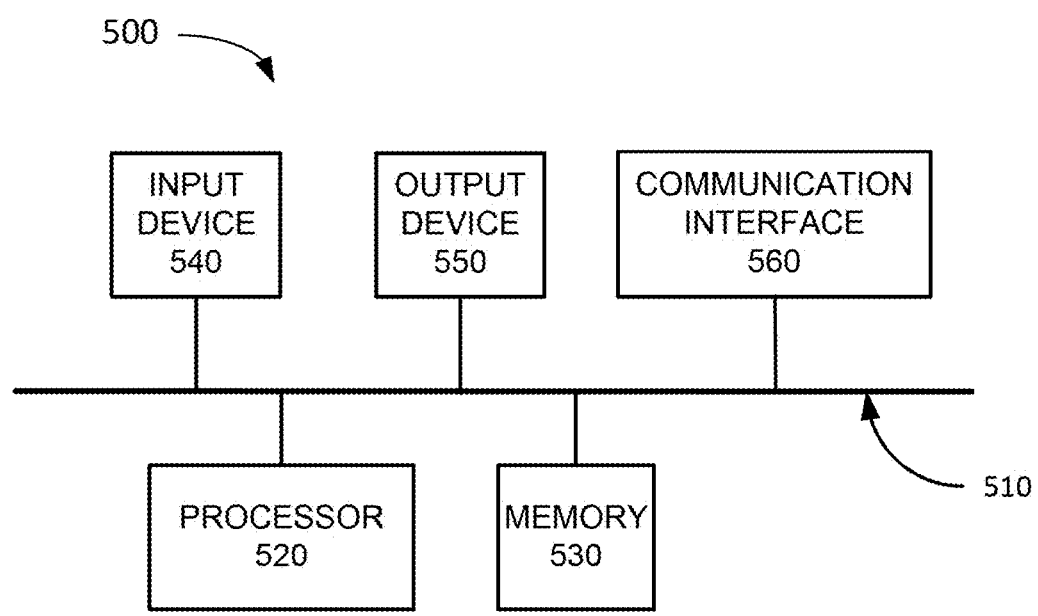
FIG. 5 is a diagram illustrating exemplary components of a system of FIG. 1.

FIG. 5 is a diagram illustrating exemplary components of device 500 according to an implementation described herein. Voice to text system 130, language processing system 140, document management system 150, results processing system 160, and/or search engine 170 may each include one or more devices 300. As shown in FIG. 5, device 500 may include a bus 510, a processor 520, a memory 530, an input device 540, an output device 550, and a communication interface 560.

Bus 510 may include a path that permits communication among the components of device 500. Processor 520 may include any type of single-core processor, multi-core processor, microprocessor, latch-based processor, and/or processing logic (or families of processors, microprocessors, and/or processing logics) that interprets and executes instructions. In other embodiments, processor 520 may include an application-specific integrated circuit (ASIC), a field-programmable gate array (FPGA), and/or another type of integrated circuit or processing logic.

Memory 530 may include any type of dynamic storage device that may store information and/or instructions, for execution by processor 520, and/or any type of non-volatile storage device that may store information for use by processor 520. In an example, memory 530 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 540 may allow an operator to input information into device 500. Input device 540 may include, for example, a keyboard, a mouse, a pen, a microphone, a remote control, an audio capture device, an image and/or video capture device, a touch-screen display, and/or another type of input device. In some embodiments, device 500 may be managed remotely and may not include input device 540. In other words, device 500 may be "headless" and may not include a keyboard, for example.

Output device 550 may output information to an operator of device 500. Output device 550 may include a display, a printer, a speaker, and/or another type of output device. In an example, device 500 may include a display, which may include a liquid crystal display (LCD) for displaying content to the customer. In some embodiments, device 500 may be managed remotely and may not include output device 550. In other words, device 500 may be "headless" and may not include a display, for example.

Communication interface 560 may include a transceiver that enables device 500 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 560 may include a transmitter that converts baseband signals to radio frequency (RF) signals and/or a receiver that converts RF signals to baseband signals. Communication interface 560 may be coupled to an antenna for transmitting and receiving RF signals.

Communication interface 560 may include a logical component that includes input and/or output ports, input and/or output systems, and/or other input and output components that facilitate the transmission of data to other devices. In an example, communication interface 560 may include a network interface card (e.g., Ethernet card) for wired communications and/or a wireless network interface (e.g., a WiFi) card for wireless communications. Communication interface 560 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 500 may perform certain operations relating to generating and providing search results in response to a voice request. Device 500 may perform these operations in response to processor 520 executing software instructions contained in a computer-readable medium, such as memory 530. A computer-readable medium may be defined as a non-transitory memory device. A memory device may be implemented within a single physical memory device or spread across multiple physical memory devices. The software instructions may be read into memory 530 from another computer-readable medium or from another device. The software instructions contained in memory 530 may cause processor 520 to perform processes described herein. Alternatively, hardwired circuitry may be used in place of, or in combination with, software instructions to implement processes described herein. Thus, implementations described herein are not limited to any specific combination of hardware circuitry and software.

Although FIG. 5 shows exemplary components of device 500, in other implementations, device 500 may include fewer components, different components, additional components, or differently arranged components than depicted in FIG. 5. Additionally or alternatively, one or more components of device 500 may perform one or more tasks described as being performed by one or more other components of device 500.

Figure 6:
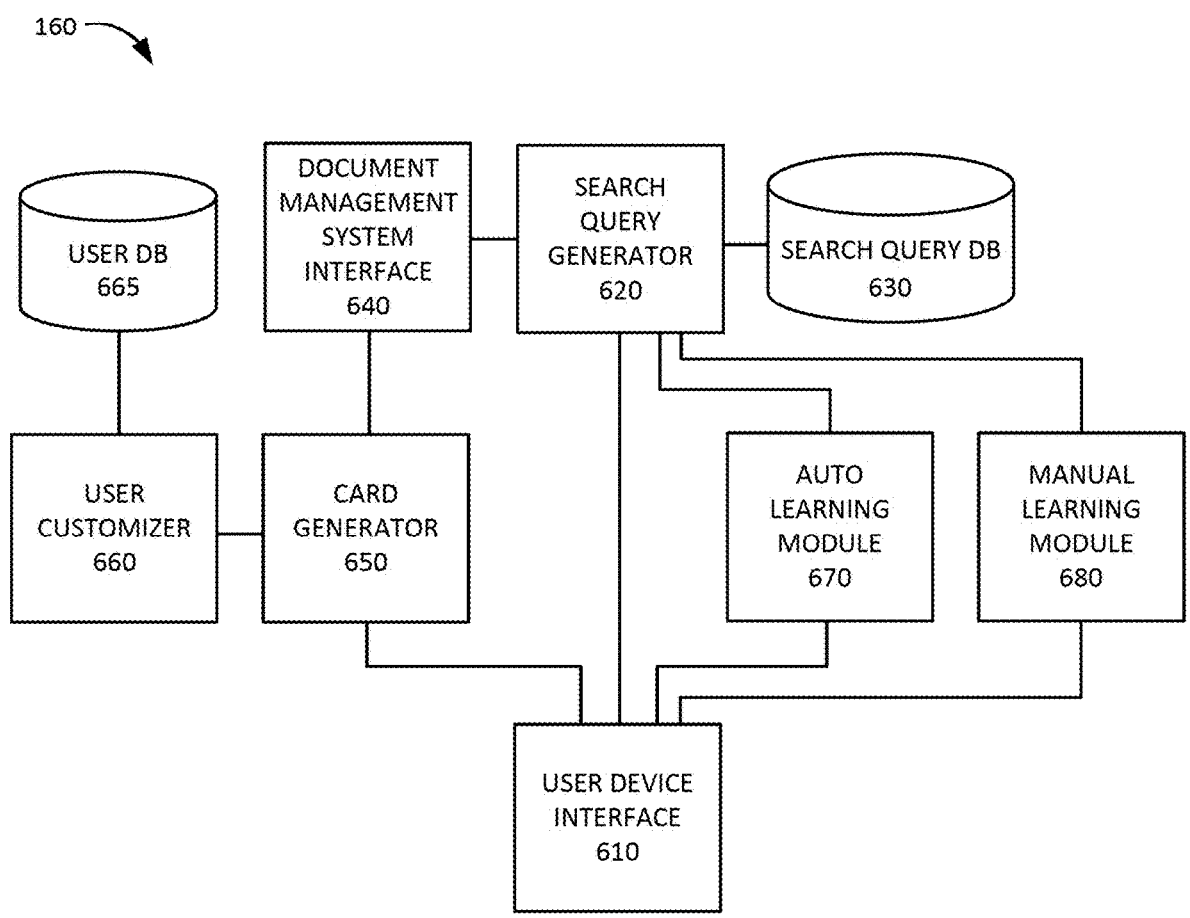
FIG. 6 is a diagram illustrating exemplary components of the results processing system of FIG. 1.

FIG. 6 is a diagram illustrating exemplary components of results processing system 160. The components of results processing system 160 may be implemented, for example, via processor 520 executing instructions from memory 530. Alternatively, some or all of the components included in results processing system 160 may be implemented via hard-wired circuitry. As shown in FIG. 6, results processing system 160 may include a user device interface 610, a search query generator 620, a search query database (DB) 630, a document management system interface 640, a card generator 650, a user customizer 660, a user DB 665, an auto learning module 670, and a manual learning module 680.

User device interface 610 may communicate with UE 110. In an example, user device interface 610 may receive a text request from UE 110 and may provide information corresponding to a set of category cards in response to the text request. Furthermore, user device interface 610 may receive information relating to a user selection of an item included in a provided category card and may provide the information to search query generator 620 and/or to auto learning module 670 to update a search query.

Search query generator 620 may communicate with language processing system 140 to generate a search query. For example, search query generator 620 may provide a text request to language processing system 140 and may receive a search query based on the text request from search query generator 620.

Search query DB 630 may store information relating to particular search queries. In an example, for a particular search query, search query DB 630 may store one or more categories associated with the search query, one or more related search queries, whether a match for one or more documents in document management system 150 exists for the particular search query, one or more applications associated with the particular search query, geographic information associated with the particular search query, product or services associated with the particular search query, and/or other types of information associated with the search query.

Document management system interface 640 may communicate with document management system 150. In an example, document management system interface 640 may request search results for a search query and may obtain search results that match a search query, or an indication that there is no match for a search query, from document management system 150.

Card generator 650 may generate information corresponding to one or more category cards based on search results obtained for a search query. Card generator 650 may determine the display capacity of UE 110 and may determine how many items may be listed on each category card based on the display capacity. Card generator 650 may further determine the number of cards to be provided to UE 110 based on the obtained search results, may determine which items are to be included in which card, and may provide the generated cards to UE 110.

User customizer 660 may customize search results based on information associated with UE 110. In an example, UE 110 may provide information identifying a subscription associated with UE 110 along with a text request and user customizer 660 may access user DB 665 to obtain information associate with the subscription. User DB 665 may store information associated with particular subscriptions associated with the provider, such as, for example, information identifying types of wireless communication devices associated with a subscription (including details relating to screen sizes, processing capacity, memory capacity, etc.), types of service plans associated with a subscription, types of services included in a subscription, a geographic location of a user associated with a subscription, and/or other types of information associated with a subscription. Thus, for example, if a user requests to search for "data plans," user customizer 660 may filter search results for data plans that are more relevant to the user based on the user's current data plan, based on the number of devices associated with the subscription, based on the user's geographic area, and/or based on other types of parameters. In other implementations, information relating a subscription may be obtained from another system (e.g., an ordering system, an account management system, a billing system, etc.) with which results processing system 160 is configured to communicate.

Auto learning module 670 may generate one or more questions for the user of UE 110 and may provide the questions in connection with related search queries, if the user's original request does not match any documents in document management system 150. Auto learning module 670 may perform auto learning based on a user's answers and/or selections in order to improve search results for a particular search query, to improve relationships between search queries, and/or to identify a match for a search query for which no matches have been previously identified.

Manual learning module 680 may provide information relating to a user's request, a corresponding generated search query, identified documents based on the search query, and/or user's selections of items on category cards provided to the user to a manual backup server and/or another type of manual review queue. An administrator or data analyst may review the obtained information manually to confirm whether particular search queries are correctly being associated with particular requests and/or whether particular search queries are correctly being associated with particular documents for products or services corresponding to the particular search queries.

Although FIG. 6 shows exemplary components of results processing system 160, in other implementations, results processing system 160 may include fewer components, different components, additional components, or differently arranged components than depicted in FIG. 6. Additionally or alternatively, one or more components of results processing system 160 may be combined such that the described capabilities are part of one or more other components of results processing system 160.

Figure 7:
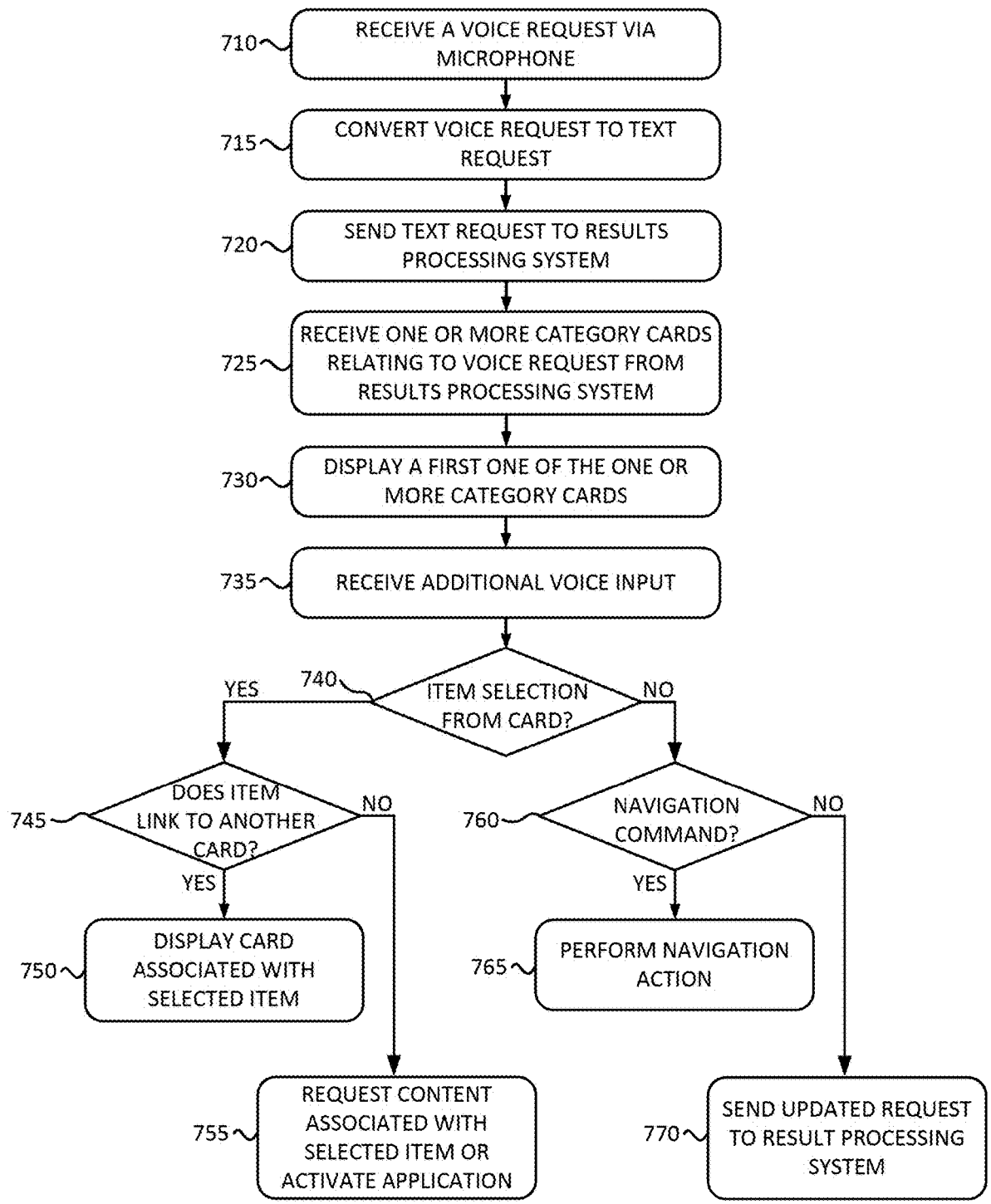
FIG. 7 is a flowchart of an exemplary process for performing a voice search according to an implementation described herein.

FIG. 7 is a flowchart of an exemplary process for performing a voice search according to an implementation described herein. In some implementations, the process of FIG. 7 may be performed by UE 110. In other implementations, some or all of the process of FIG. 7 may be performed by another device or a group of devices separate from UE 110 or including UE 110.

The process of FIG. 7 may include receiving a voice request via a microphone (block 710) and converting the voice request to a text request (block 715). In an example, microphone interface 410 may obtain audio data that includes a voice request using microphone 230 and may provide the audio data to voice to text module 420. Voice to text module 420 may use an API to send the audio data to voice to text system 130 and may receive a text request from voice to text system 130 corresponding to the voice request.

The text request may be sent to a results processing system (block 720), one or more category cards may be received from the results processing system (block 725), and the one of the one or more category cards may be displayed (block 730). In an example, system interface 430 may send the text request to results processing system 160 and may receive, in response, information corresponding to one or more category cards from results processing system 160. Results processing system 160 may designate one of the category cards as a first or top card and display module 440 may display the first card in a position indicating it is the category card most relevant to the user's search. The first card may include one or more selectable items. A user may select one of the selectable items by touching the screen, pressing a button, or by providing additional voice input.

Where more than one category card is found to be relevant to the search query, in some implementations, only the first card is displayed, and any additional cards are retained by the UE for display depending on selections made by the user from the first card (which may cause navigation to a different card). In other implementations, multiple cards are displayed (with the first card displayed in a manner to indicate it is most relevant to the user's query). Such implementations may also provide the multiple cards in an order that is relevant to the search query, such that the user may, for example, visualize position within a multi-step process.

Additional voice input may be received (block 735) and a determination may be made as to whether the additional voice input corresponds to an item selection from the displayed card (block 740). In an example, microphone interface 410 may capture additional audio input and may provide the captured audio input to voice to text module 420. Voice to text module 420 may convert the audio input to a text command via voice to text system 130. In some implementation, voice to text module 420 may convert the audio input to a text command locally. As an example, results processing system 160 may provide voice recognition for the selectable items included in a category card. As another example, voice to text module 420 may include a local database of voice recognition data for navigation commands and/or item selection commands.

If it is determined that the voice input corresponds to an item selection from the displayed card (block 740—YES), a determination may be made as to whether the selected item links to another card (block 745). If the selected item links to another card (block 745—YES), the card associated with the selected item may be displayed or otherwise brought into focus (block 750). In an example, navigation module 450 may activate the selected item, the selected item may link to another one of the category cards, and display module 440 may display the corresponding category card (or if already being displayed, make the corresponding card more prominent in the user interface, such as by highlighting, bringing to the front of the stack, repositioning, etc.). If the selected item does not link to another card (block 745—NO), content associated with the selected item may be requested or an application may be activated (block 755). If the selected item does not link to another card, the selected item may link to a document in document management system 150 or to an application installed on UE 110. If the selected item links to a document, voice assistant application 401 may use a browser application to access the document in document management system 150. If the selected item link to an application on UE 110, such as a navigation application, a purchasing application, a billing application, a customer service application, a messaging application, and/or another type of application, the application may be activated.

Returning to block 740, if it is determined that the voice input corresponds to an item selection from the displayed card (block 740—NO), a determination may be made as to whether the voice input corresponds to a navigation command (block 760). A navigation command may enable the user to navigate between category cards. In an example, the user may voice a "go back" command to go back to a previous category card, a "go forward" command to go to a next category card in a set of sequenced category cards, a "start over" command to begin a new voice request, a "list all" command to list a set of available category cards in a cascading arrangement, a "reorder" command to list the available cards in a user defined order based on subsequent verbal input, and/or may speak a different type of navigation command that navigation module 450 is configured to recognize.

If it is determined that the voice input corresponds to a navigation command (block 760—YES), a navigation action may be performed (block 765). As an example, navigation module 450 may go back to a previous category card, may go to a next category card, may start a new voice request, may list all available category cards, and/or may perform a different type of navigation action. As another example, navigation module 450 may display a stack or layout of cards or a layout of cards that the user has previously viewed or requested, in response to a command (e.g., a "list all" command, a "see previous" command, a "card stack" command, a "card layout" command, etc.). The user may speak a voice command, perform a gesture, touch a selectable item (e.g., icon), press a button, or otherwise input a navigation command, and the arrangement of the displayed stack or layout of cards may be changed based on the navigation command. In an example, the user may speak a "go forward" or "go backward" command and a highlighted card in the stack or layout may be moved forward or backward and a different card may be highlighted. Additionally or alternatively, the user may select another card and the selected card may be added to the stack of cards.

If it is determined that the voice input does not correspond to a navigation command (block 760—NO), an updated request may be sent to the results processing system (block 770). In an example, navigation module 450 may determine that the voice request does not correspond to an item selection from a card or a navigation command and may interpret the voice input as a continuation of a previous voice request or a new voice request. In response, after voice to text module 420 has converted the voice request to a text request, system interface 430 may request new search results from results processing system 160. Thus, the displayed results and/or category cards may be updated in real-time as the user continues to speak or speaks a new request.

Figure 8:
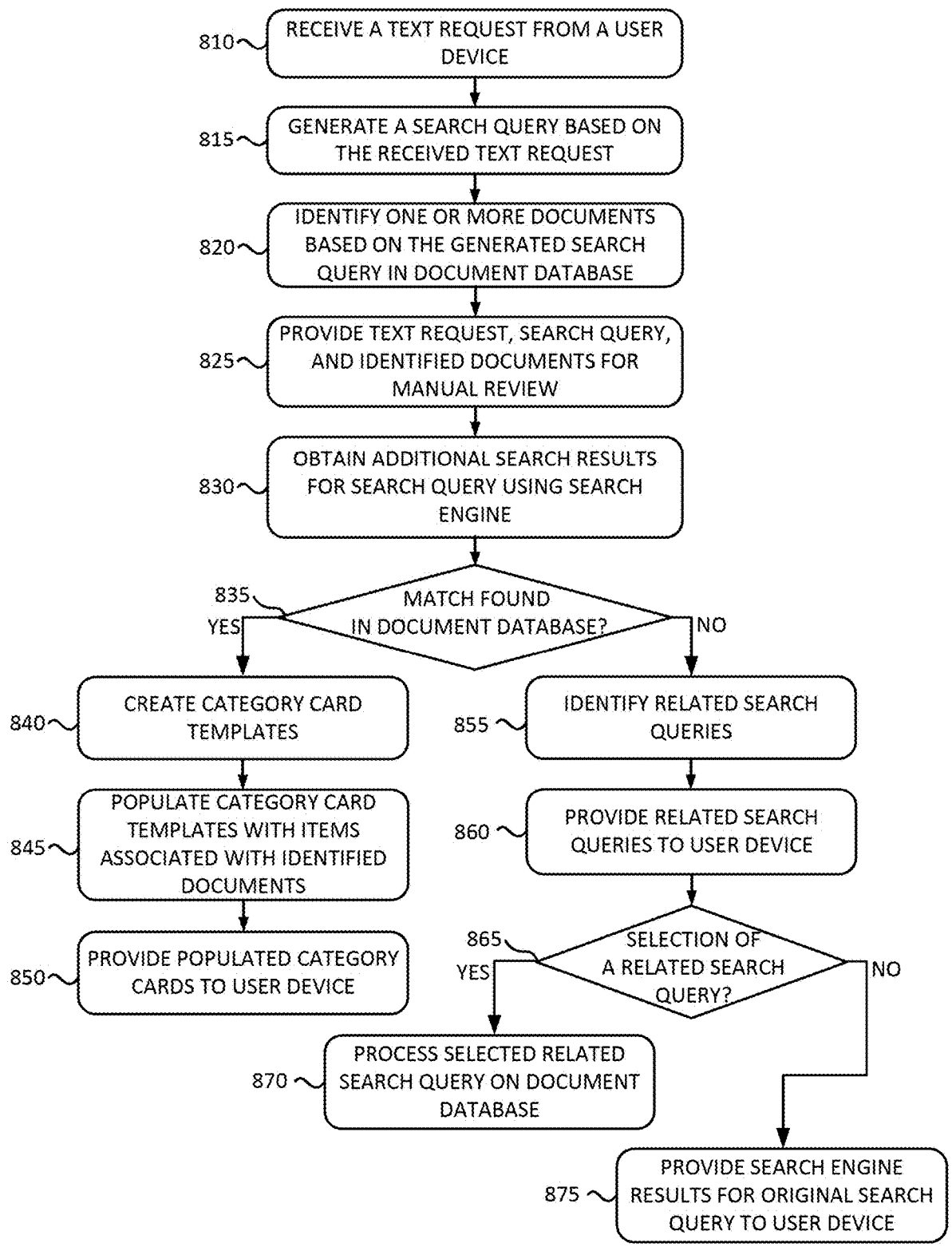
FIG. 8 is a flowchart of an exemplary process for providing voice search results according to an implementation described herein.

FIG. 8 is a flowchart of an exemplary process for providing voice search results according to an implementation described herein. In some implementations, the process of FIG. 8 may be performed by one or more devices 500. In other implementations, some or all of the process of FIG. 8 may be performed by another device or a group of devices separate from devices 500 or including devices 500.

The process of FIG. 8 may include receiving a text request from a user device (block 810), generating a search query based on the received text request (block 815), and identifying one or more documents in a document database based on the generated search query (block 820). In an example, user device interface 610 of results processing system 160 may receive a text request from UE 110 and may provide the text request to language processing system 140 to generate a search query based on the text request. Language processing system 140 may tag each token (e.g., each word) of the text request with a part of speech and may strip out non-relevant tokens. Furthermore, language processing system 140 may add a weight to each token to indicate a relative importance of the token to the search query. Language processing system 140 may provide the generated search query to results processing system 160 and results processing system 160 may submit the search query to document management system 150 to identify one or more documents that match the search query.

The text request, generated search query, and any identified documents may be provided for manual review (block 825). In an example, manual learning module 680 may provide the text request, the generated search query, and any identified documents to a manual backup server and/or another type of manual review queue for manual review by an administrator or data analyst. Additional search results may be obtained by providing the search query to a search engine (block 830). In an example, search query generator 620 may provide the search query to search engine 170 and may obtain a set of search results for the search query from search engine 170.

A determination may be made as to whether a match was found in the document database (block 835). If it determined that there was a match in the document database (block 835—YES), category card templates may be created (block 840), the category card templates may be populated with items associated with the identified documents (block 845), and the populated category cards may be provided to the user device (block 850). Card generator 650 may determine the display capacity of UE 110 (e.g., based on subscription information that includes device information) and may determine how many items may be listed on each category card. Card generator 650 may then determine the number of cards to be provided to UE 110 and may determine which items are to be included in which card. The category cards may be organized in various ways. As an example, card generator 650 may designate a first or top card based on a main category and may include items that link to cards associated with sub-categories for the main category. As another example, card generator 650 may designate a first card in a sequence of cards, wherein each card provides a set of options for the user to select. By navigating the sequence of cards, the user is able to select a series of options for a product or service. As yet another example, a card may include an item that links to a document associated with a particular product or service in document management system 150. As yet another example, a card may include an item that activates an application on UE 110. In some implementations, all the generated cards may be provided to UE 110 initially. In other implementations, a first card may be provided to UE 110 and subsequent cards may be provided based on the selections made by the user of UE 110.

Returning to block 835, if it determined that there was no match in the document database (block 835—NO), related search queries may be identified (block 855) and the related search queries may be provided to the user device (block 860). In an example, the user may make a request that cannot be clearly disambiguated into a category or search query, or may be associated with a search query for which documents have not been generated or documents which have not been correctly matched with the search query. If no match is identified for the search query in document management system 150, search query generator 620 may access search query DB 630 to determine one or more related search queries. Related search queries may be explicitly associated with the search query or may be determined through a regression match with existing or queries previously submitted by users and stored in search query DB 630. The identified related search queries may be provided to UE 110 along with one or more prompts to determine whether the related search queries satisfy the user's request.

A determination may be made as to whether a selection of a related search query has been made (block 865). If the user has selected a related search query (block 865—YES), the selected related search query may be processed on the document database (block 870). In an example, the process may return to block 820 to identify documents in the document database of document management system 150 using the selected related search query. If the user has not selected a related search query (block 865—NO), the obtained search engine results (from block 830) based on the original search query may be provided to the user device (block 875). In an example, user device interface 610 may instruct a browser application on UE 110 to access a search results page obtained from search engine 170. The search results page may first be filtered based on relevance to the provider. In an example, the search results may be filtered based on documents relevant to products or services associated with the provider (e.g., documents associated with a domain name of the provider).

Figure 9:
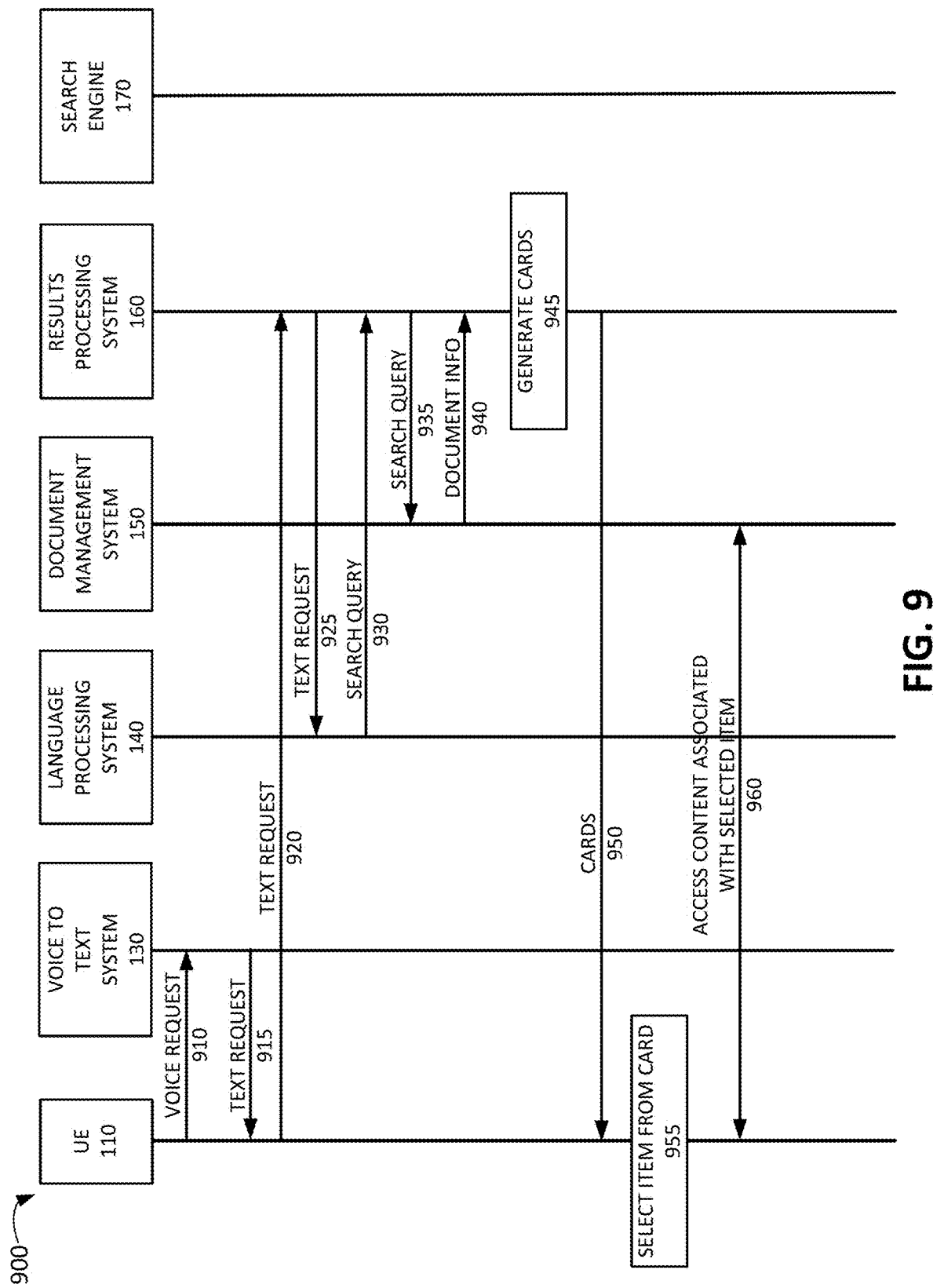
FIG. 9 is a first exemplary signal flow diagram according to an implementation described herein.

FIG. 9 is an exemplary signal flow diagram 900 according to an implementation described herein. In signal flow diagram 900, document management system 150 may include a match for the search query generated based on the user's voice request. As shown in FIG. 9, UE 110 may send a voice request to voice to text system 130 (signal 910), and voice to text system 130 may convert the voice request to a text request and may return the text request to UE 110 (signal 915). UE 110 may send the text request to results processing system 160 (signal 920).

Results processing system 160 may send the text request to language processing system 140 (signal 925), language processing system 140 may generate a search query based on the text request, and may provide the generated search query to results processing system 160 (signal 930). Results processing system 160 may then use the search query to request search results from document management system 150 (signal 935) and document management system 150 may provide information identifying search results that match the search query to results processing system 160 (signal 940).

Results processing system 160 may then generate cards based on the identified matching documents (block 945). In an example, results processing system 160 may determine the display capacity of UE 110 and may determine how many items may be listed on each category card. Results processing system 160 may then determine the number of cards to be provided to UE 110 and may determine which items are to be included in which card. Results processing system 160 may provide the generated cards to UE 110 (signal 950). UE 110 may display a first one of the cards and the user may select an item from the card (block 955). Assume that the selected item is linked to one of the search results. In response, UE 110 may access the content associated with the selected item by communicating with document management system 150 (signal 960).

Figure 10:
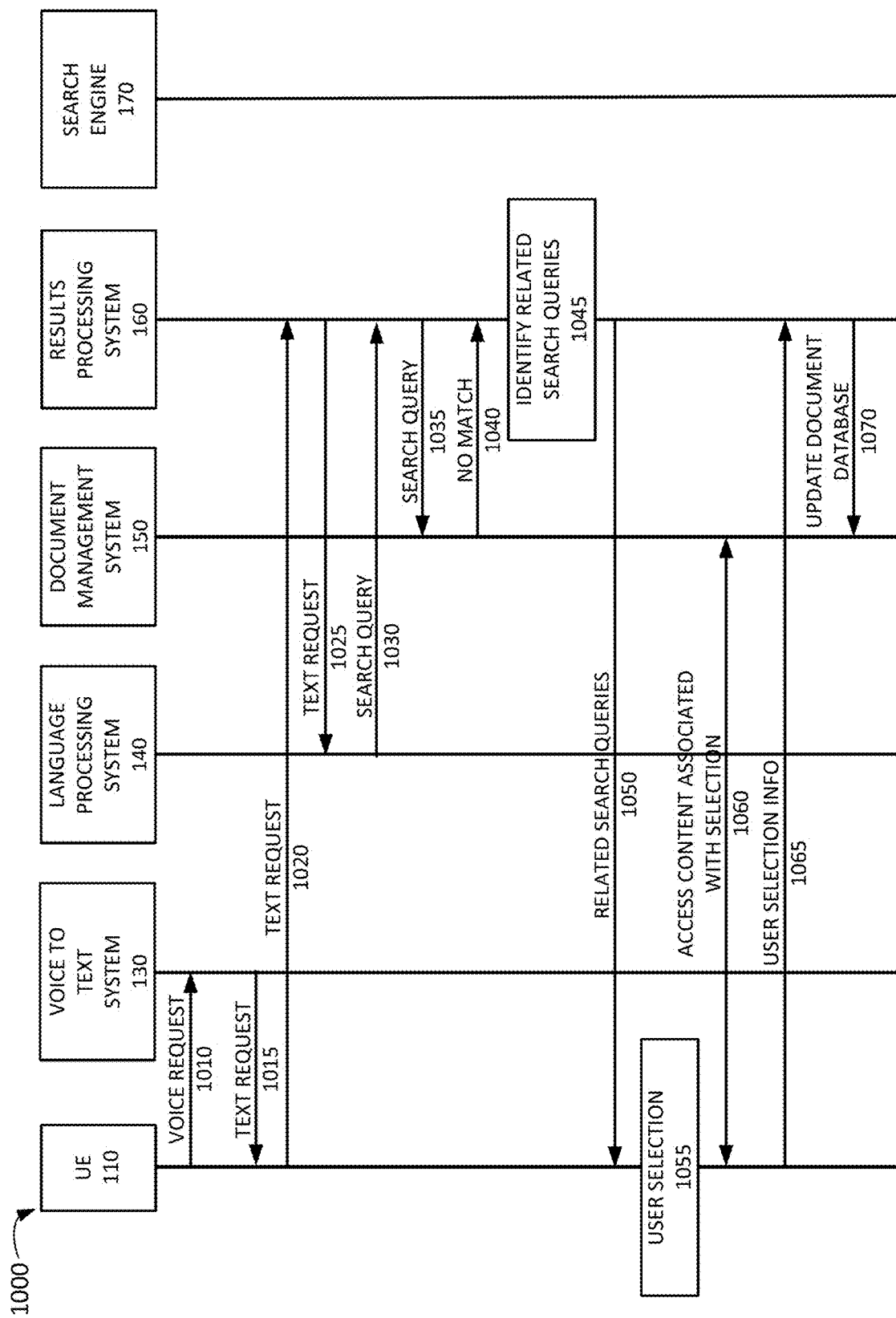
FIG. 10 is a second exemplary signal flow diagram according to an implementation described herein.

FIG. 10 is a second exemplary signal flow diagram 1000 according to an implementation described herein. In signal flow diagram 1000, document management system 150 may not find a match for the search query generated based on the user's voice request. As shown in FIG. 10, UE 110 may send a voice request to voice to text system 130 (signal 1010), and voice to text system 130 may convert the voice request to a text request and may return the text request to UE 110 (signal 1015). UE 110 may send the text request to results processing system 160 (signal 1020).

Results processing system 160 may send the text request to language processing system 140 (signal 1025), language processing system 140 may generate a search query based on the text request, and may provide the generated search query to results processing system 160 (signal 1030). Results processing system 160 may then use the search query to request search results from document management system 150 (signal 1035) and document management system 150 may indicate that no exact match exists for the search query (signal 1040). In response, results processing system 160 may identify one or more related search queries stored in search query DB 630 (block 1045) and may provide the identified related search queries to UE 110 (signal 1050) as a list of items on a category card. Each item, associated with a related search query, may point to content in document management system 150 or may point to an application on UE 110.

The user may select one of the search queries (block 1055). In response, UE 110 may activate a browser application to access a document stored in document management system 150 (signal 1060). Furthermore, voice assistant application 401 may provide information about the user selection to results processing system 160 (signal 1065) and results processing system 160 may activate auto learning module 670. Auto learning module 670 may update search query DB 630 based on the user's selection and/or may update a search index in document management system 150 based on the user's selection (signal 1070).

Figure 11:
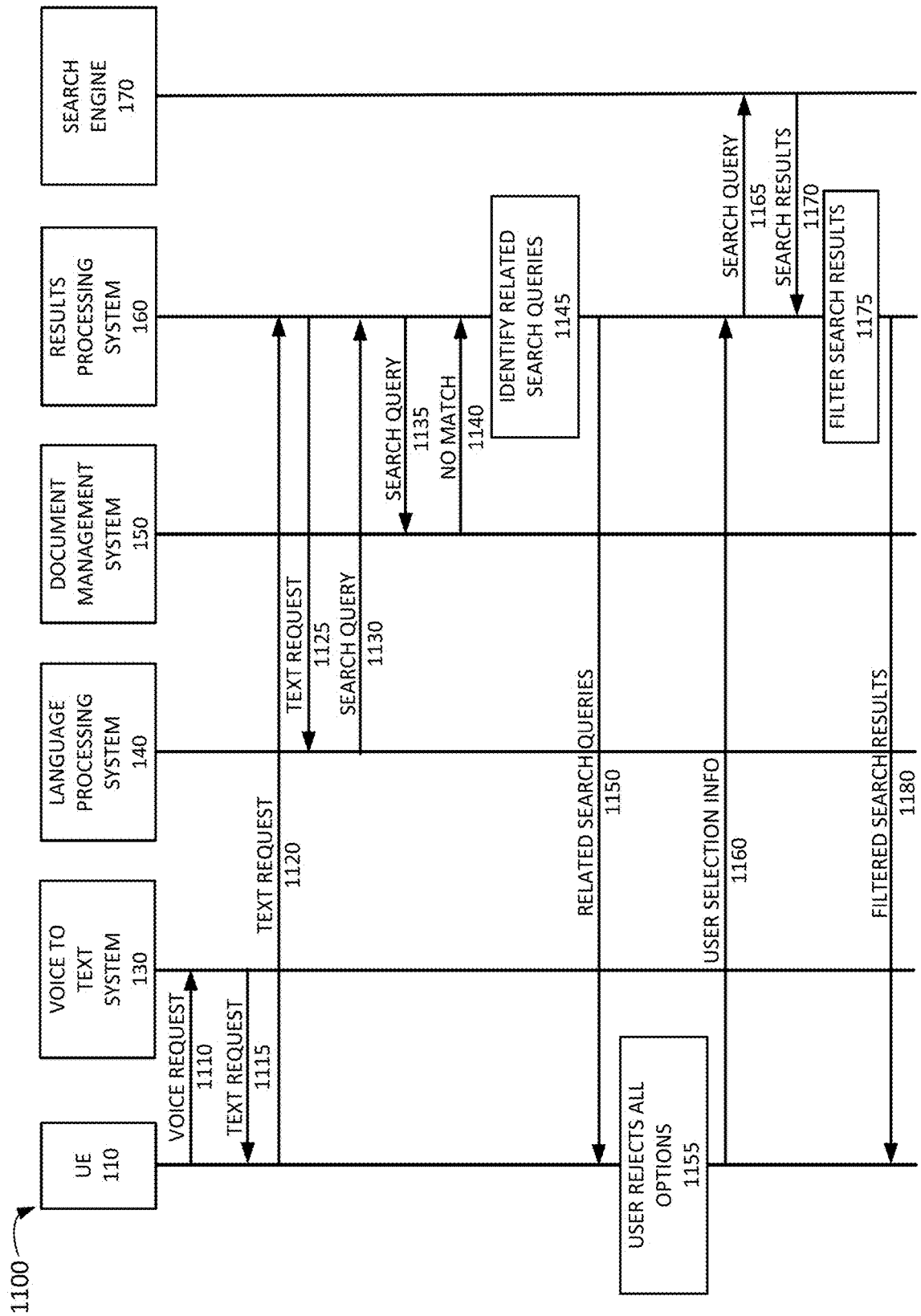
FIG. 11 is a third exemplary signal flow diagram according to an implementation described herein.

FIG. 11 is a third exemplary signal flow diagram 1100 according to an implementation described herein. In signal flow diagram 1100, document management system 150 may not find a match for the search query generated based on the user's voice request and a user may reject all suggested related search queries. As shown in FIG. 11, UE 110 may send a voice request to voice to text system 130 (signal 1110), and voice to text system 130 may convert the voice request to a text request and may return the text request to UE 110 (signal 1115). UE 110 may send the text request to results processing system 160 (signal 1120).

Results processing system 160 may send the text request to language processing system 140 (signal 1125), language processing system 140 may generate a search query based on the text request, and may provide the generated search query to results processing system 160 (signal 1130). Results processing system 160 may then use the search query to request search results from document management system 150 (signal 1135) and document management system 150 may indicate that no exact match exists for the search query (signal 1140). In response, results processing system 160 may identify one or more related search queries stored in search query DB 630 (block 1145) and may provide the identified related search queries to UE 110 (signal 1150) as a list of items on a category card. Each item, associated with a related search query, may point to content in document management system 150 or may point to an application on UE 110.

The user may reject all the options provided as related search queries to the user's original request (block 1155). Information about the user's selection to reject all the options may be provided to results processing system 160 (signal 1160). In response, results processing system 160 may send the original search query to search engine 170 (signal 1165) and may obtain search results from search engine 170 (signal 1170). Results processing system 160 may filter the obtained search results based on relevance to products or services associated with the provider (block 1175) and may provide the filtered search results to UE 110 (signal 1180).

Figure 12A:
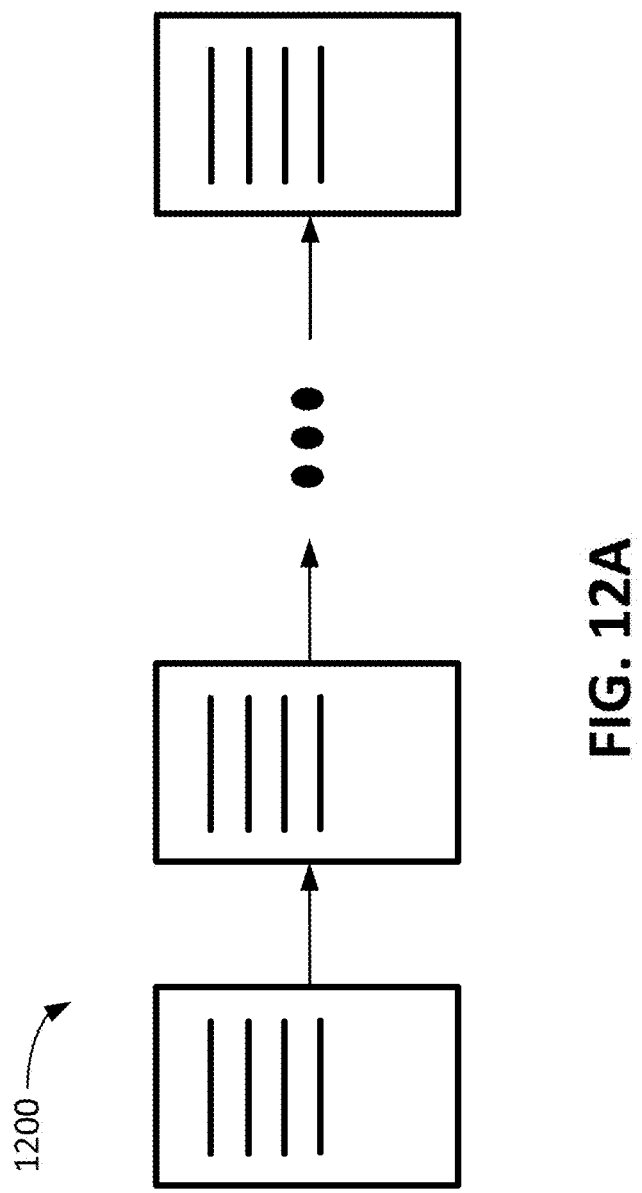
FIGS. 12A, 12B, 12C, and 12D are diagrams of exemplary user interfaces according to an implementation described herein.

FIGS. 12A, 12B, 12C, and 12D are diagrams of exemplary user interfaces for a first scenario according to an implementation described herein. FIG. 12A illustrates a card arrangement 1200 in which a sequence of category cards is generated. In the sequence, a user makes a selection from a set of options on each category card to arrive at a set of selections for a product, service, or customer help question, as described in more detail below.

Figure 12B:
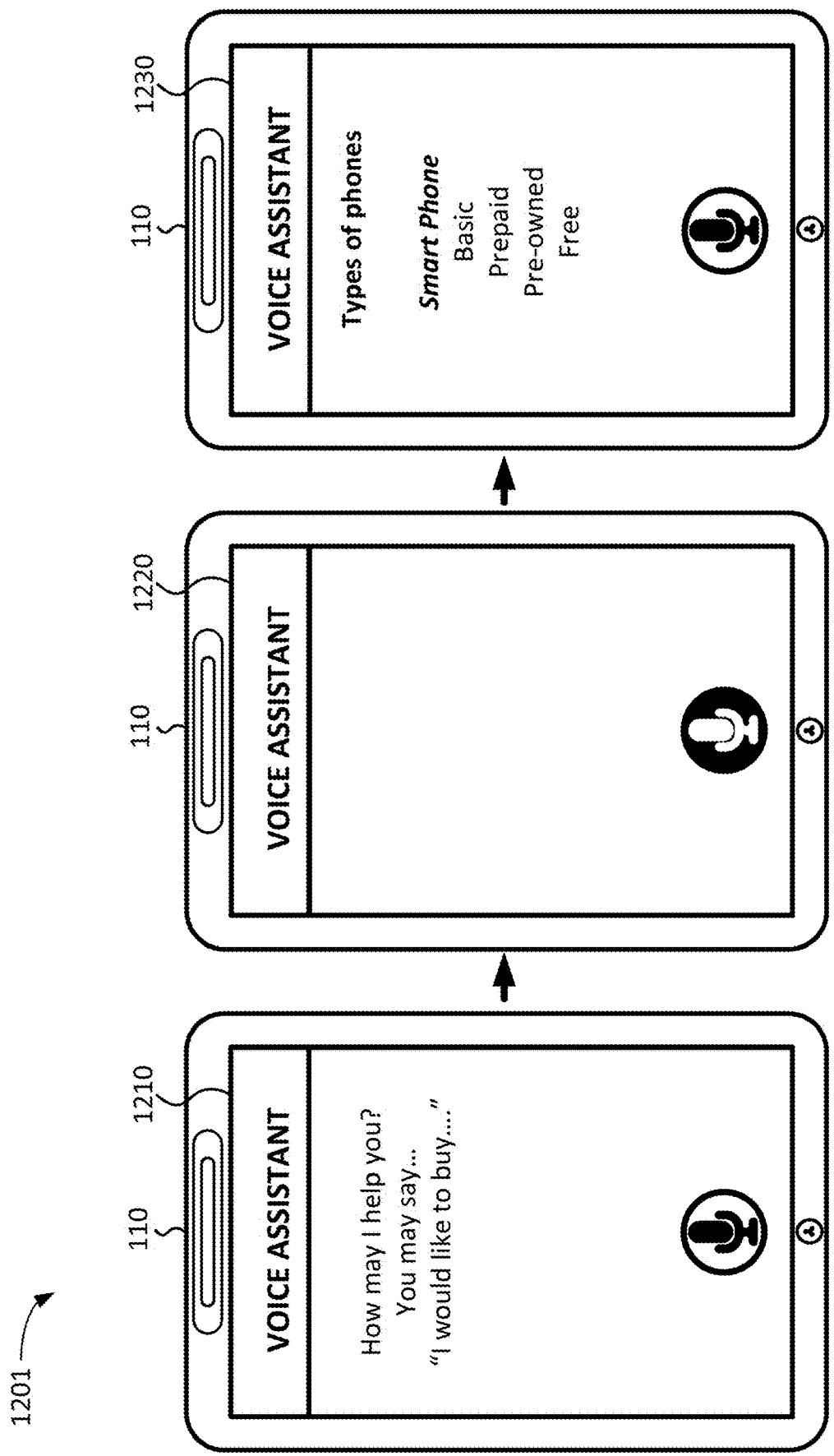

As shown in FIG. 12B, UE 110 may include a user interface 1210 generated when a user activates voice assistant application 401 by, for example, interacting with a touchscreen, clicking on an icon, pressing a button on UE 110, or by speaking into microphone 230. User interface 1210 may prompt a user to speak a voice request. User interface 1220 may include a highlighted microphone icon when a user is speaking to indicate that UE 110 is receiving the user's voice input.

Assume the user speaks the sentence "I would like to buy a new phone for my son, but I don't want to spend more than four hundred dollars. He likes to listen to music." UE 110 may receive a set of cards according to card arrangement 1200 from results processing system 160 and may display a first card associated with a "phone purchase" category, with a "smart phone" item, a "basic" phone item, a "prepaid" phone item, a "pre-owned" phone item, and a "free" phone item. Voice assistant application 401 may generate user interface 1230, which displays types of new phones that a user may select. The user may speak a selection. Assume the user speaks the phrase "smart phone."

Figure 12C:
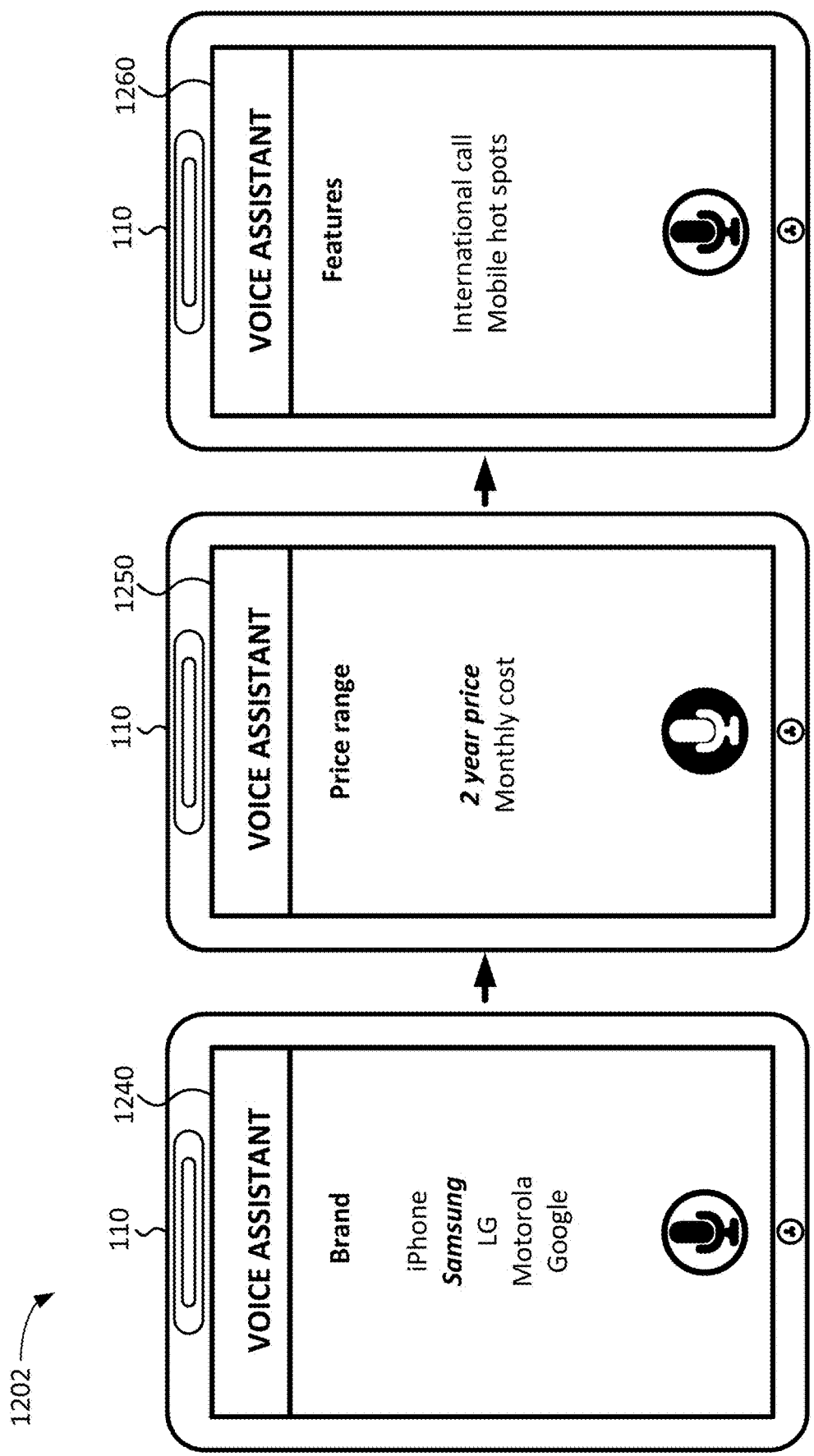

Continuing in FIG. 12C, after the user speaks a selection, voice assistant application 401 may display user interface 1240 that includes a card associated with a category which may be designated as a next category, which may correspond to a card associated with a phone brand category, which includes an "iPhone" item, a "Samsung" item, an "LG" item, a "Motorola" item, and a "Google" item. After the user selects one of the items on the phone brand category card, voice assistant application 401 may display user interface 1250 that includes a card associated with a category which may be designated as a next category, which may correspond to a card associated with a price range category, with a "2 year price" item and a "monthly cost" item. After the user selects one of the items on the price range category card, voice assistant application 401 may display user interface 1260 that includes a card associated with a category which may be designated as a next category, which may correspond to a card associated with a "features" category, with an "International calls" item and a "Mobile hot spots" item. The features category may be the last category associated with the phone purchase category and, in response to the user voice a selection via user interface 1260, voice assistant application 401 may direct the user to a web page for a phone that includes all the options selected by the user via user interfaces 1230, 1240, 1250, and 1260.

Figure 12D:
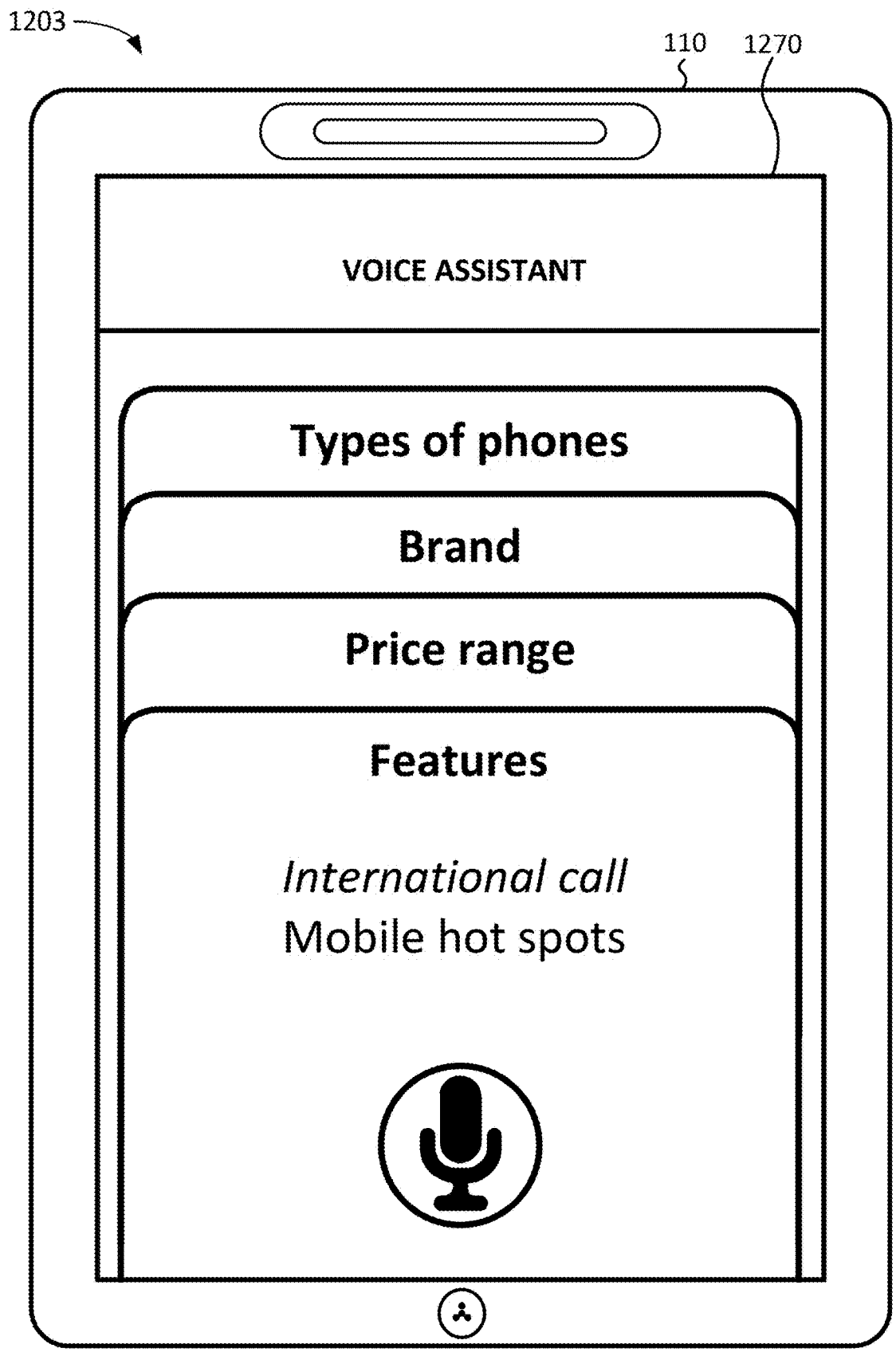

As shown in FIG. 12D, UE 110 may include a user interface 1270 generated in response to a user selection to view a stack of the previously displayed cards. In an example, the user may speak a verbal command, such as "view all," "see previous," "display stack," "reorder," and/or another type of verbal command to display a stack of the previous cards. Alternatively, the user may perform a particular gesture (e.g., a pinching gesture, etc.) on the touchscreen of user device to display the stack of cards. The user may then select any of the cards in the stack to return to a particular card or to highlight a particular card to select the particular card as the active card. If all the cards cannot be displayed at once, the user may scroll or otherwise navigate through the stack of cards, and/or change the size and/or orientation of the stack of cards, by speaking verbal commands, by performing gestures, by activating an icon or other type of displayed selection object, and/or by pressing a button on UE 110. Moreover, the user may select how much of each card in the stack should be displayed and/or how much of a particular card in the stack should be displayed (e.g., 10% of each card, 20% of each card, 50% of a selected highlighted card, etc.). In another embodiment, the user may rearrange the stack in a preferred order by verbally indicating the cards to be displayed. In an example, the user may speak a series of commands, such as "features", "price", "brand" and "types", indicating the order of the cards to be displayed.

Figure 13A:
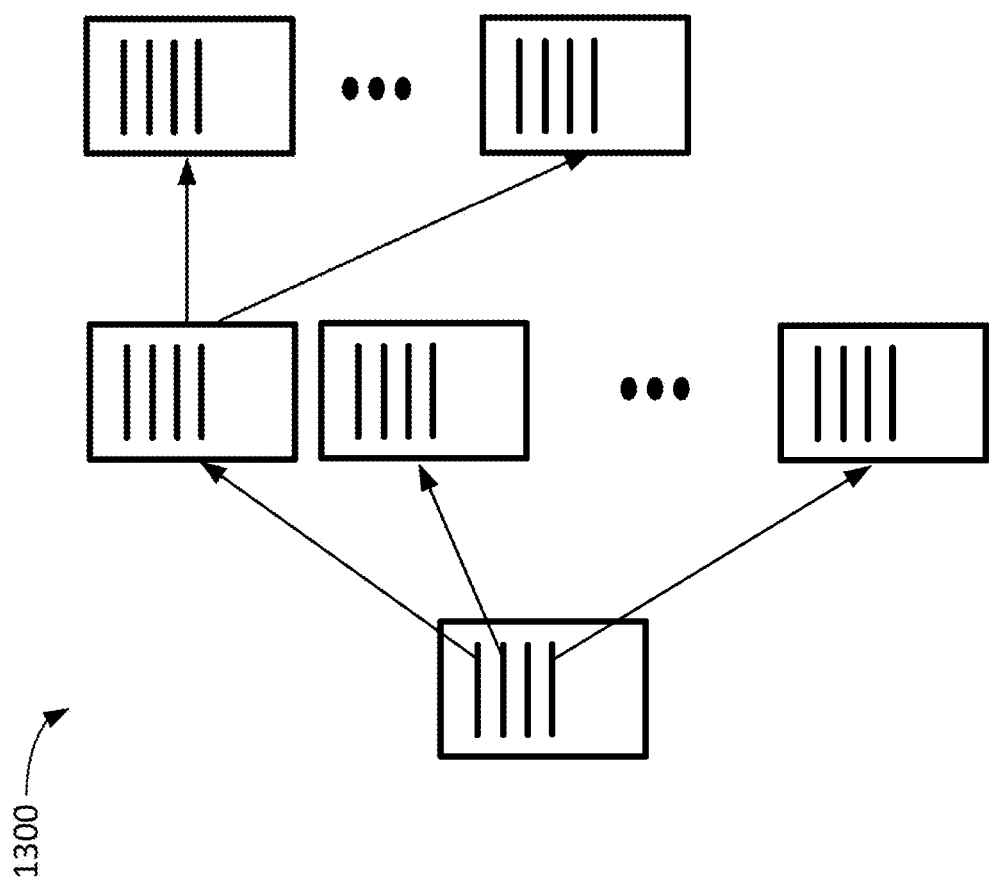
FIGS. 13A, 13B, and 13C are diagrams of exemplary user interfaces according to an implementation described herein.
Figure 13B:
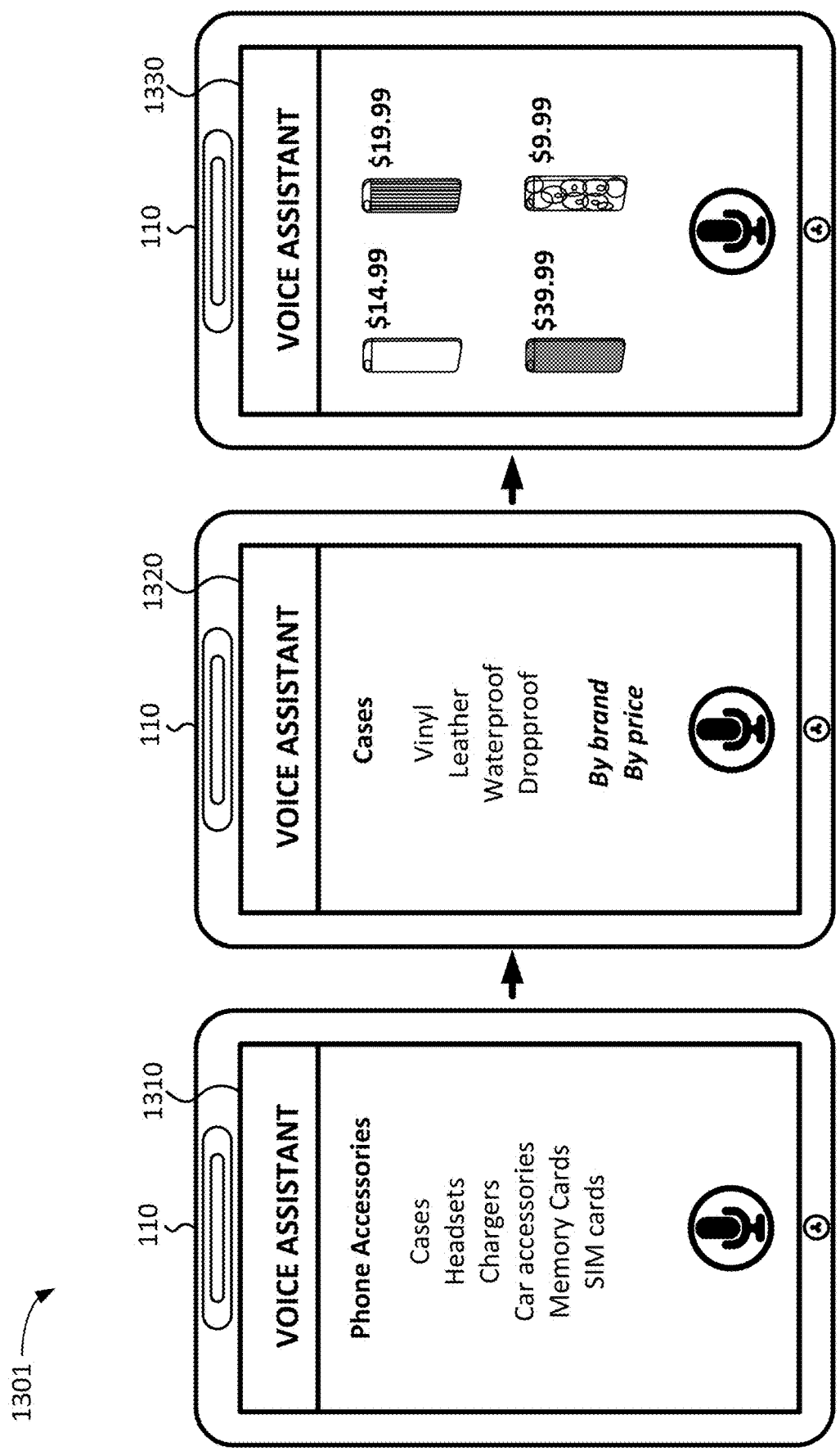

FIGS. 13A and 13B are diagrams of exemplary user interfaces for an embodiment according to an implementation described herein. FIG. 13A illustrates a card arrangement 1300 in which generated category cards are organized in a tree structure with each category card including a set of items for sub-categories. The user may navigate the tree structure of the cards to arrive at a single selection, as described below.

As shown in FIG. 13B, in response to a user request "buy phone accessories," UE 110 may receive information corresponding to a set of cards according to card arrangement 1300 from results processing system 160 and may display a user interface 1310 that includes a first card that shows various categories of phone accessories available for purchase. The user may select one of the categories by, for example, speaking the word "cases," at which point a category card for "cases" may be displayed in a user interface 1320. The user may then select a sub-category by speaking the word "vinyl" to select vinyl cases. UE 110 may then select the "vinyl" item, which may cause UE 110 to access a document (e.g., web page) in document management system 150 that includes available vinyl cases and prices and may display the document as user interface 1330.

Figure 13C:
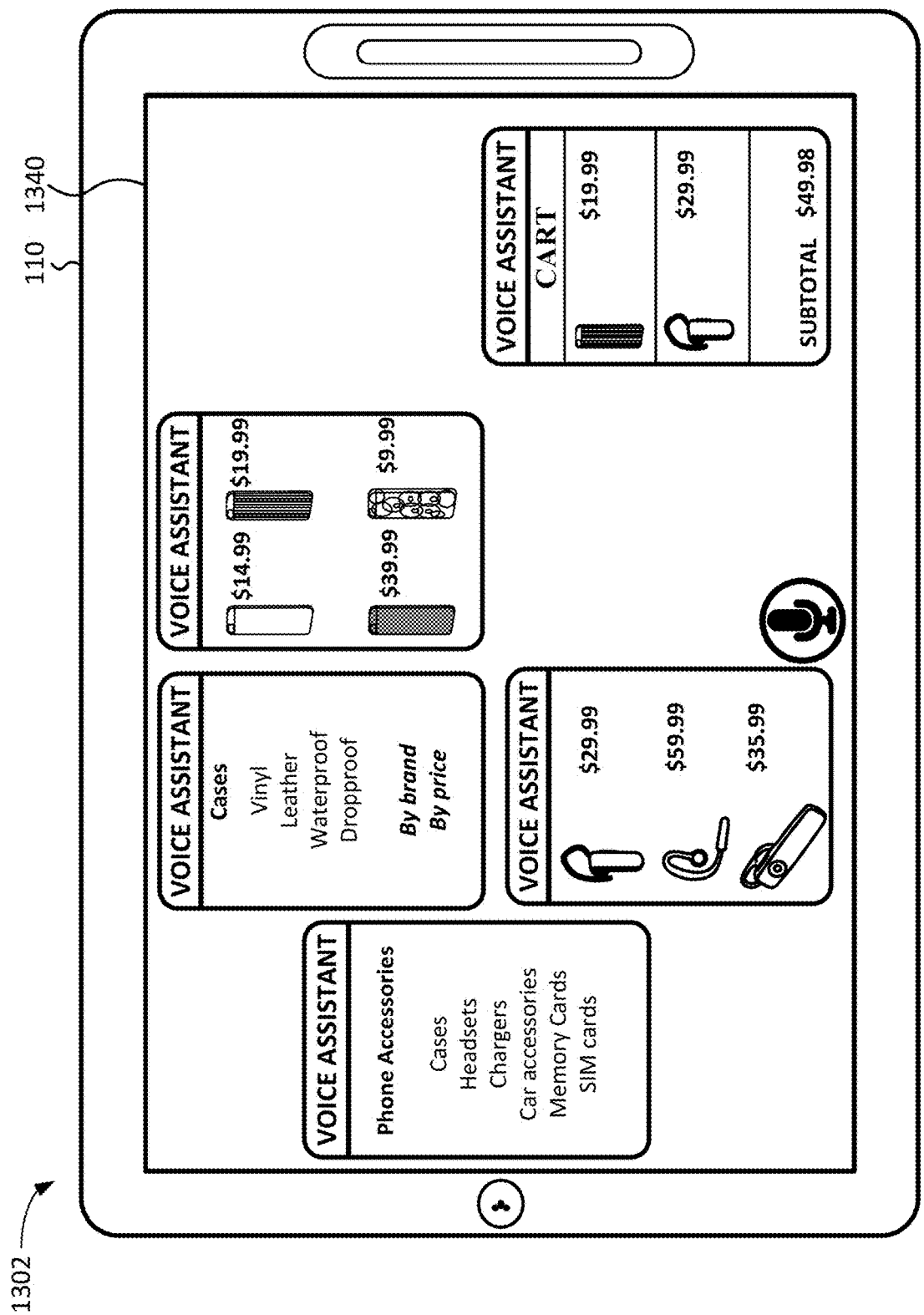

As shown in FIG. 13C, UE 110 may include a user interface 1340 generated in response to a user selection to view a layout of the previously displayed cards. In an example, the user may speak a verbal command, such as "view all," "see previous," "display layout," and/or another type of verbal command to display a layout of the previous cards. In some implementations, the layout may follow the tree structure of a category card and associated sub-category cards. In the example of user interface 1340, a phone accessories card may be shown with a subcategory card for wireless headsets and a subcategory card for phone cases along with a further subcategory card of vinyl cases. Furthermore, the example of user interface 1340 shows a "cart" card that includes a virtual shopping card for items that the user has selected and placed in the shopping cart. The user may select one of the cards from the layout to display the card (e.g., the card may take up a larger area, or even the entire area, of the display upon selection). Moreover, the user may navigate through the layout using swiping gestures or voice commands (e.g., if the card layout does not fit onto the display) and/or may change the size of orientation of the layout using gestures or voice commands. In some implementations, the layout may follow the commands of the user and not require the user to view categories and subcategories that are not relevant to the user. In an example, the user may bypass certain cards and specify the order in which the cards are displayed. In an example with reference to FIG. 13C, assume a user knows that they are interested in vinyl cases, the user may specify vinyl cases directly from the accessories screen and the "case" card will not be displayed because the user has indicated a specific subcategory. In this manner, the number of cards, and the resulting clutter is removed from display 1340, and only cards relevant to the user are displayed in the order that is of interest to the user.

Figure 14A:
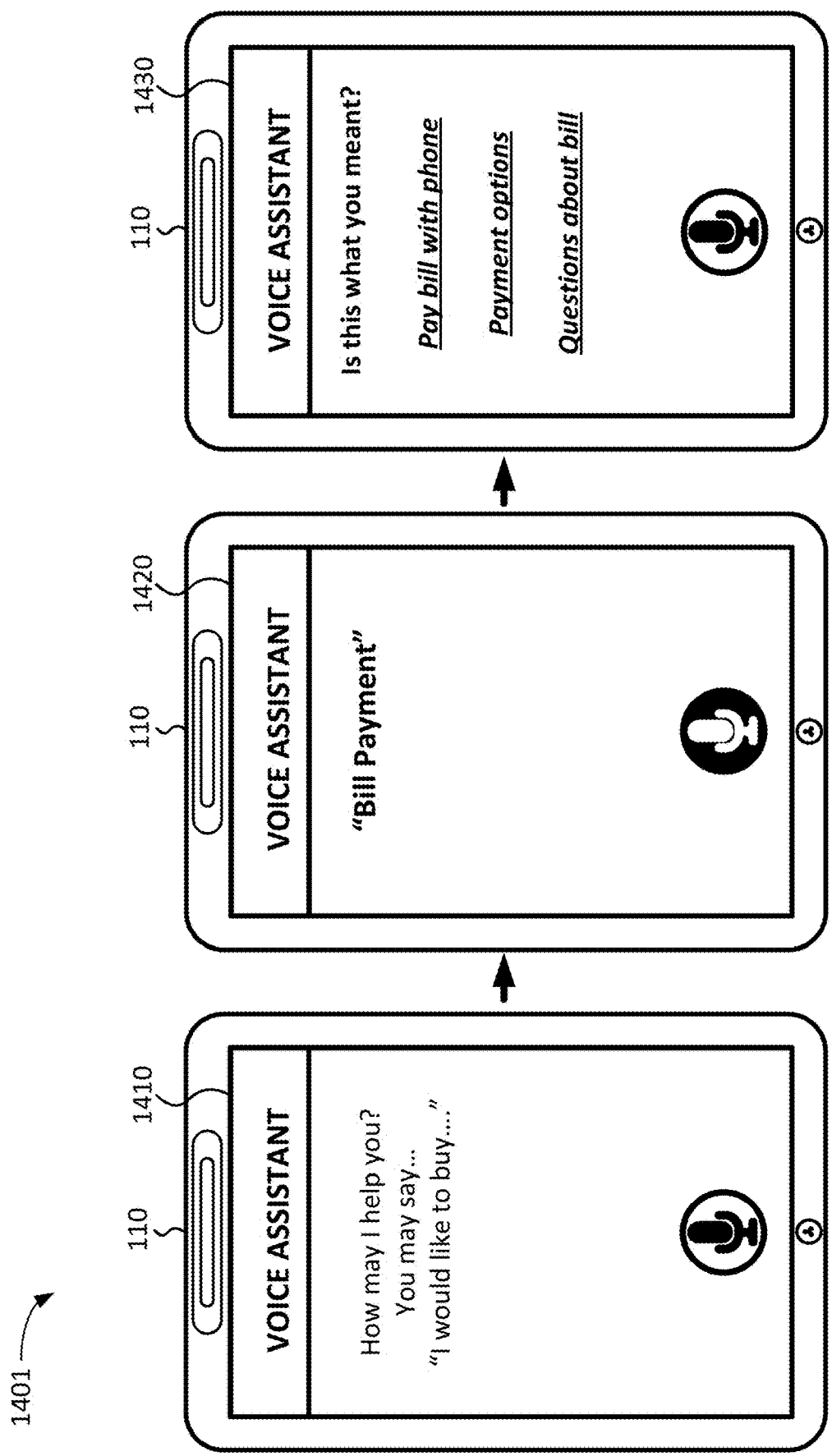
FIGS. 14A, 14B, 14C, and 14D are diagrams of exemplary user interfaces for a according to an implementation described herein.
Figure 14B:
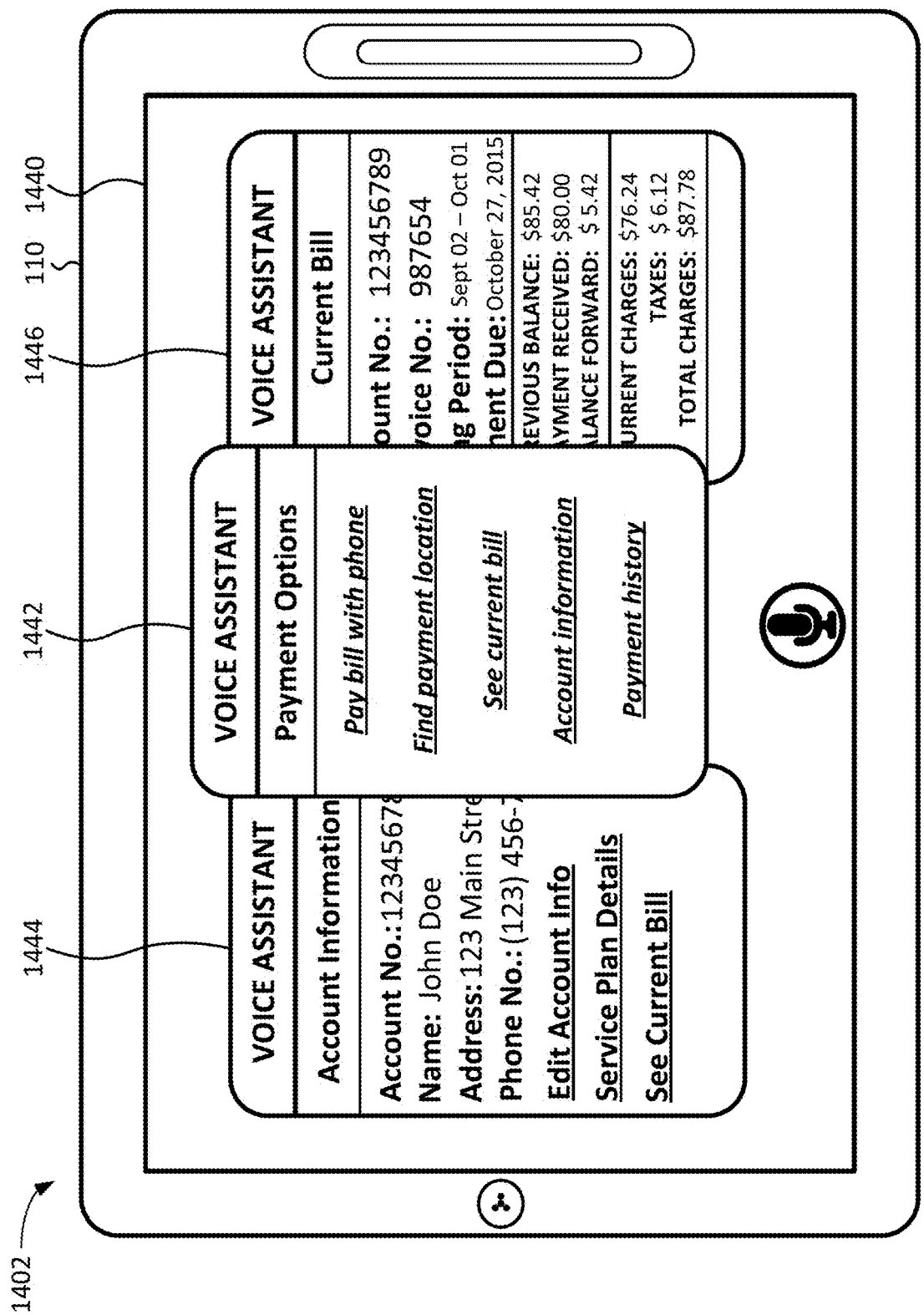

FIGS. 14A and 14B are diagrams of exemplary user interfaces for a scenario according to an implementation described herein. As shown in FIG. 14A, UE 110 may include a user interface 1410 generated when a user activates voice assistant application 401. User interface 1420 may include a highlighted microphone icon when a user is speaking to indicate that UE 110 is receiving the user's voice input and may display a text request obtained from voice to text system 130 based on the user's spoken voice request. Assume the user speaks the words "bill payment." Results processing system 160 may not be able to disambiguate the text request into a particular category and may, in response, provide a set of related search queries in user interface 1430. User interface 1430 may include a "pay bill with phone" item, which may launch a bill payment application on UE 110 if selected, a "payment options" item, which may cause results processing system 160 to search document management system 150 for documents matching a "payment options" search query, and a "questions about bill" item, which may cause results processing system 160 to search document management system 150 for documents matching a "questions about bill" search query. In this manner, results processing engine 160 may be enabled to disambiguate search requests.

As shown in FIG. 14B, UE 110 may include a user interface 1440 generated in response to a user selection of a "payment options" selection from user interface 1430 of FIG. 14A. A "payment options" card 1442 may be presented to the user. The user may select an "account information" item and an "account information" card 1444 may be displayed in response to the user's selection that includes account information for an account associated with the user. The user may navigate back to the "payment options" card 1442 and may select a "current bill" item. In response, a "current bill" card 1446 may be displayed that includes information relating to the user's current bill. The user may then be able to navigate between the three cards. In an example, the user may select to display the "payment options" card 1442, the "account information" card 1444, and the "current bill" card 1446 as a stack of cards as shown in FIG. 14B. The user may select which card is the active card by speaking voice commands or by performing gestures on touchscreen 220 of UE 110 and/or may select the active card to increase the displayed size of the active card.

The user interface paradigm implemented herein has particular utility in depicting processes that require multiple user selections. In an example, in the case of the purchase of a mobile phone, a user may be required to specify the phone that is desired, the service plan that is desired, the payment plan that is desired, and any accessories that may be useful, each of which may entail multiple options for selection. By using the category card user interface, a user can visualize the various steps of the purchase process, refer back to prior selections, and make selections "out-of-order" (e.g., specifying the payment plan prior to selecting the phone) in any order the user chooses. A mobile phone purchase is only one example of a use of the category card user interface; others are also possible (for example, car purchases, clothing purchases, food preparation, etc.)

Figure 14C:
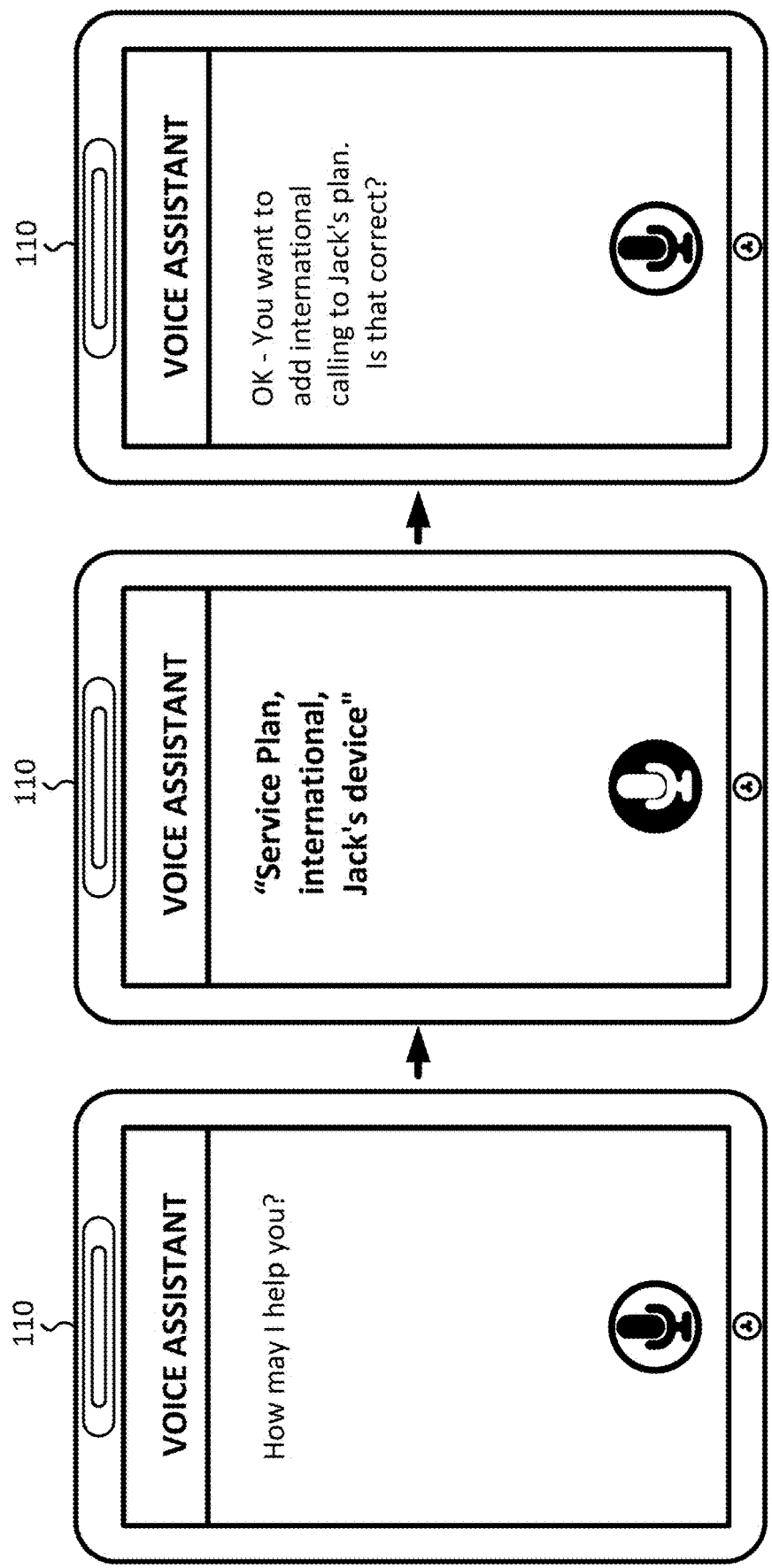

Another example of a use of the systems and methods described herein is shown in FIG. 14C. In this example, a user is using a UE 110 to access a service provider interface in order to make changes to a service being provided to the user. The service provider interface may be through an application executing on the UE 110, through a web-based portal accessible from a browser on UE 110, through an interactive voice response (IVR) facility over a telephony connection, or a combination thereof. The user may provide a voice query that is received by UE 110. This query may be in a "natural language" format—for example "I want to add an international calling plan to the phone for Jack"—or a list of relevant words that may be interpreted to cause a desired result—for example, "service plan, international, device Jack, voice". The latter format may be useful as a shortcut for complex operations, and could be used in situations where expert assistance is involved and/or for frequently used operations.

Figure 14D:
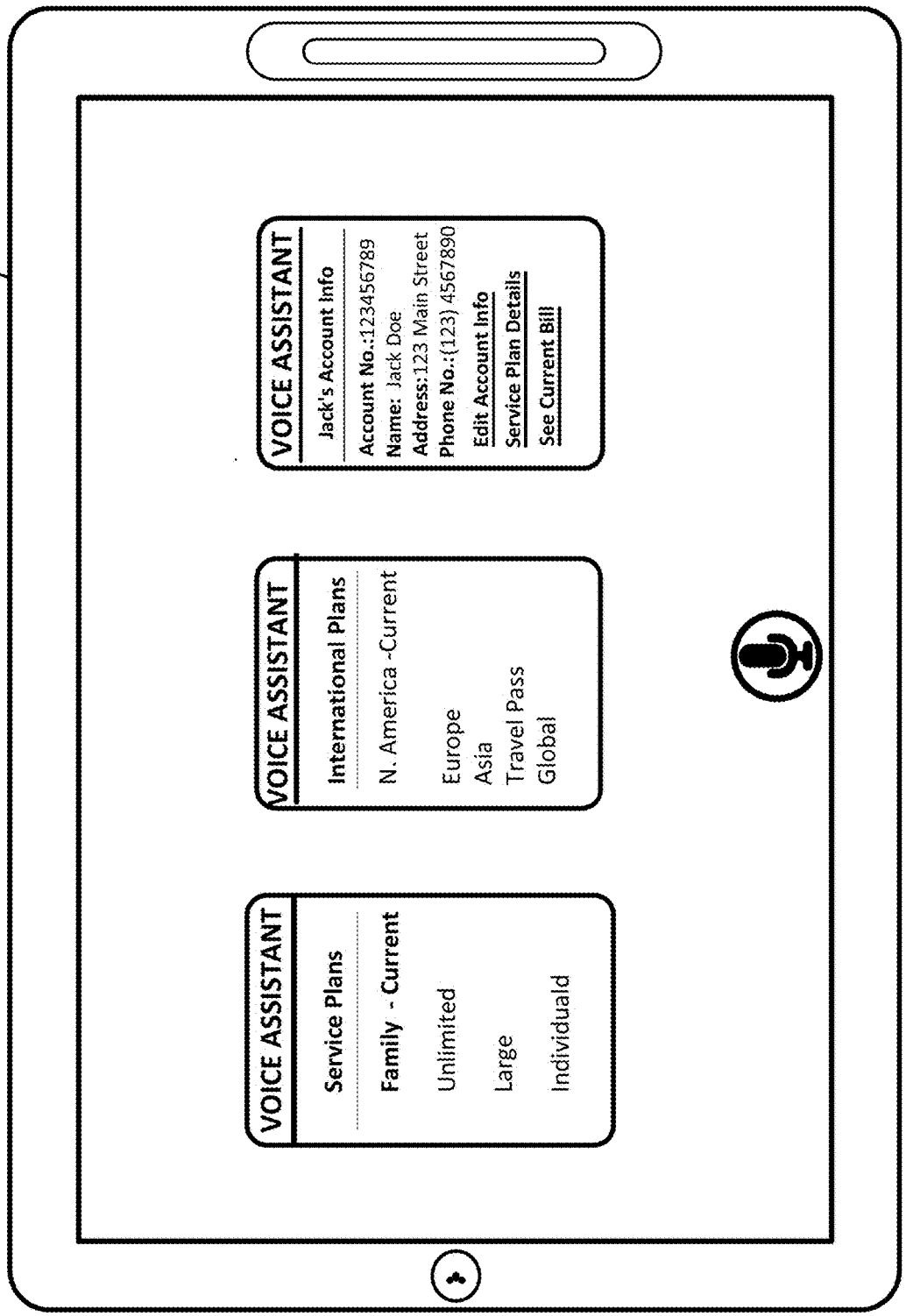

Upon receipt of the search query text, the system determines the relevant category cards for the search. The cards may reflect the multiple options or actions which need to be taken by the user to effect the desired operation. The system may determine the relevant category cards based on pre-existing process definitions that indicate which options or actions are part of the process, and any required or default order. Once the relevant cards have been determined, the cards are provided to UE 110. UE 110 then displays the cards using the visual object device metaphor that has been implemented (in this case, rectangular cards), such that the user may visualize the multiple options/actions of the process needed to achieve the result. The cards may be displayed in a default or required order, including any relationships between cards. FIG. 14D depicts the category cards that were selected based on the user's voice commands such as "service plan", "international" and "device Jack." In the "service plan" card, the user's current service plan is shown, with an option to change plans. In the "international" card the user's current international plan is shown, with options to change plans. In the "user device" card Jack's current device is shown with an indication showing that it is not configured for international use as well as other options to update the device. In this manner, the user can select the categories and subcategories without having to navigate through a series of tree/branch relationships. Additionally or alternatively, the displayed cards may be displayed in the order selected by the user and not in any necessarily logical order.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

As an example, while series of blocks have been described with respect to FIGS. 7 and 8, and series of signal flows have been described with respect to FIGS. 9-11, the order of the blocks and/or signal flows may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a wireless communication device, the method comprising:
   receiving, by the wireless communication device, a voice request via a microphone;
   converting, by the wireless communication device, the received voice request into a text request;
   sending, by the wireless communication device, the text request to a results processing system;
   receiving, by the wireless communication device, information corresponding to one or more cards from the results processing system in response to the text request, wherein each of the one or more cards is associated with a category associated with the voice request;
   displaying, by the wireless communication device, a first card of the one or more cards as a rectangular visual object manipulable by a user to change at least any two of a size, position, orientation, or order of the rectangular visual object, wherein the first card includes a list of items associated with a first category, wherein each one of the list of items includes a link to at least one of another one of the one or more cards or a link to an application installed on the wireless communication device;
   receiving, by the wireless communication device, a selection of an item from the list of items included in the first card;
   determining, by the wireless communication device, that the selected item corresponds to a link to another of the one or more cards; and
   displaying, by the wireless communication device, the other one of the one or more cards, in response to determining that the selected item corresponds to the link to the other one of the one or more cards.

2. The method of claim 1, further comprising:
   selecting multiple ones of the one or more cards for display on a display of the wireless communication device;
   displaying the selected multiple ones of the one or more cards as a stack or layout of cards; and
   arranging the displayed multiple ones of the one or more cards based on the voice request.

3. The method of claim 1, further comprising:
   receiving additional voice input;
   determining that the additional voice input corresponds to a selection of an item from the list of items included in a displayed card of the one or more cards; and
   performing an action to process the selected item.

4. The method of claim 3, wherein performing the action to process the selected item includes:
   accessing a document stored on a document server;
   signaling the results processing system that the item has been selected;
   activating the application on the wireless communication device;
   displaying another one of the one or more cards;
   requesting a particular card from the results processing system; or
   navigating to a previously displayed card of the one or more cards.

5. The method of claim 1, wherein receiving the selection of the item from the list of items included in the first card includes:
receiving additional voice input; and wherein displaying the other one of the one or more cards is performed in response to receiving the additional voice input.

6. The method of claim 1, wherein the list of items associated with the first category further includes a link to a product or service page associated with a provider of products or services, and wherein the product or service page is associated with a communication product or service for the wireless communication device, including information identifying a subscription associated with the wireless communication device in the text request sent to the results processing system; and
wherein at least one of the items in the list of items included on the first card is based on the subscription associated with the wireless communication device.

7. The method of claim 1, further comprising:
receiving, from the results processing system, a prompt to ask the user of the wireless communication device to indicate whether the list of items included in the first card corresponds to what the user requested via the voice request;
receiving an indication from the user in response to the prompt; and
providing the indication to the results processing system.

8. The method of claim 1, further comprising:
displaying multiple ones of the one or more cards as a stack or layout of cards;
receiving a navigation command; and
changing an arrangement of the displayed multiple ones of the one or more cards based on the received navigation command.

9. A wireless communication device comprising:
a memory storing instructions; and
a processor configured to execute the instructions to:
receive a voice request via a microphone;
convert the received voice request into a text request;
send the text request to a results processing system;
receive information corresponding to one or more cards from the results processing system in response to the text request, wherein each of the one or more cards is associated with a category associated with the voice request;
display a first card of the one or more cards as a rectangular visual object manipulable by a user to change at least any two of a size, position, orientation, or order of the rectangular visual object, wherein the first card includes a list of items associated with a first category, wherein each one of the list of items includes at least one of a link to another one of the one or more cards or a link to an application installed on the wireless communication device;
receive a selection of an item from the list of items included in the first card;
determine that the selected item corresponds to a link to another of the one or more cards; and
display the other one of the one or more cards, in response to determining that the selected item corresponds to the link to the other one of the one or more cards.

10. The wireless communication device of claim 9, wherein, when receiving the selection of the item from the list of items included in the first card, the processor is further configured to:
receive additional voice input; and
wherein processor is to display the other one of the one or more cards based on the additional voice input.

11. The wireless communication device of claim 9, wherein the processor is further configured to:
receive additional voice input;
determine that the additional voice input corresponds to a selection of an item from the list of items included in a displayed card of the one or more cards; and
perform an action to process the selected item, wherein when performing the action to process the selected item, the processor is configured to:
access a document stored on a document server;
signal the results processing system that the item has been selected;
activate the application on the wireless communication device;
display another one of the one or more cards;
request a particular card from the results processing system; or
navigate to a previously displayed card of the one or more cards.

12. The wireless communication device of claim 9, wherein the processor is further configured to:
receive additional voice input; and
display an additional or different one of the one or more cards in real-time, in response to receiving the additional voice input.

13. The wireless communication device of claim 9, wherein the processor is further configured to:
display multiple ones of the one or more cards as a stack or layout of cards;
receive a selection of another one of the one or more cards; and
adding the selected other one of the one or more cards to the stack or layout of cards.

14. A non-transitory computer-readable memory device storing instructions executable by a processor, the non-transitory computer-readable memory device comprising:
one or more instructions to receive a voice request via a microphone;
one or more instructions to convert the received voice request into a text request;
one or more instructions to send the text request to a results processing system;
one or more instructions to receive information corresponding to one or more cards from the results processing system in response to the text request, wherein each of the one or more cards is associated with a category associated with the voice request;
one or more instructions to display a first card of the one or more cards as a rectangular visual object manipulable by a user to change at least any two of a size, position, orientation, or order of the rectangular visual object, wherein the first card includes a list of items associated with a first category, wherein each one of the list of items includes at least one of a link to another one of the one or more cards or a link to an application installed on a wireless communication device;
one or more instructions to receive a selection of an item from the list of items included in the first card;
one or more instructions to determine that the selected item corresponds to a link to another of the one or more cards; and one or more instructions to display the other one of the one or more cards, in response to determining that the selected item corresponds to the link to the other one of the one or more cards.

15. The non-transitory computer-readable memory device of claim 14, further comprising:
    one or more instructions to select multiple ones of the one or more cards for display on a display of the wireless communication device;
    one or more instructions to display the selected multiple ones of the one or more cards as a stack or layout of cards; and
    one or more instructions to arrange the displayed multiple ones of the one or more cards based on the voice request.

16. The non-transitory computer-readable memory device of claim 14, further comprising:
    one or more instructions to receive additional voice input;
    one or more instructions to determine that the additional voice input corresponds to a selection of an item from the list of items included in a displayed card of the one or more cards; and
    one or more instructions to perform an action to process the selected item.

17. The non-transitory computer-readable memory device of claim 16, wherein the one or more instructions to perform the action to process the selected item include:
    one or more instructions to access a document stored on a document server;
    one or more instructions to signal the results processing system that the item has been selected;
    one or more instructions to activate the application on the wireless communication device;
    one or more instructions to display another one of the one or more cards;
    one or more instructions to request a particular card from the results processing system; or
    one or more instructions to navigate to a previously displayed card of the one or more cards.

18. The non-transitory computer-readable memory device of claim 14, wherein the list of items associated with the first category further includes a link to a product or service page associated with a provider of products or services, and wherein the product or service page is associated with a communication product or service for the wireless communication device, including information identifying a subscription associated with the wireless communication device in the text request sent to the results processing system; and
    wherein at least one of the items in the list of items included on the first card is based on the subscription associated with the wireless communication device.

19. The non-transitory computer-readable memory device of claim 14, further comprising:
    one or more instructions to receive, from the results processing system, a prompt to ask the user of the wireless communication device to indicate whether the list of items included in the first card corresponds to what the user requested via the voice request;
    one or more instructions to receive an indication from the user in response to the prompt; and
    one or more instructions to provide the indication to the results processing system.

20. The non-transitory computer-readable memory device of claim 14, further comprising:
    one or more instructions to display multiple ones of the one or more cards as a stack or layout of cards;
    one or more instructions to receive a navigation command; and
    one or more instructions to change an arrangement of the displayed multiple ones of the one or more cards based on the received navigation command.

* * * * *